(12) United States Patent
Igawa et al.

(10) Patent No.: US 6,560,645 B1
(45) Date of Patent: May 6, 2003

(54) DELIVERY SCHEDULE MANAGEMENT METHOD, APPARATUS FOR IMPLEMENTING THE METHOD, PROCESSING PROGRAM THEREOF AND MEDIUM HAVING THE PROGRAM RECORDED THEREIN

(75) Inventors: Kumiko Igawa, Kawasaki (JP); Nobuya Okayama, Kawasaki (JP); Hiroshi Koike, Maebashi (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/473,278

(22) Filed: Dec. 28, 1999

(30) Foreign Application Priority Data

Dec. 28, 1998 (JP) .......................... 10-372543

(51) Int. Cl.⁷ .............................. G06F 17/06
(52) U.S. Cl. ................ 709/223; 709/217; 709/219; 709/203
(58) Field of Search ................ 709/223, 217, 709/219; 705/26

(56) References Cited

U.S. PATENT DOCUMENTS

| 5,506,782 | A |   | 4/1996 | Omae et al. |         |
|-----------|---|---|--------|-------------|---------|
| 5,600,573 | A |   | 2/1997 | Hendricks et al. |    |
| 5,799,157 | A | * | 8/1998 | Escallon ........... | 705/27 |
| 5,860,068 | A | * | 1/1999 | Cook ............... | 705/26 |
| 6,226,618 | B1 | * | 5/2001 | Downs et al. ....... | 380/279 |

FOREIGN PATENT DOCUMENTS

| EP | 1016949     | 7/2000  |
| EP | 1017001     | 7/2000  |
| EP | 1017002     | 7/2000  |
| JP | A-8-11152   | 1/1996  |
| JP | A-8-272859  | 10/1996 |
| JP | 8272859     | 10/1996 |
| JP | A-9-204378  | 8/1997  |
| JP | 9204378     | 8/1997  |
| JP | 1049583     | 2/1998  |
| JP | 10254850    | 9/1998  |
| JP | 10-373649   | 7/2000  |
| JP | 10-373650   | 7/2000  |
| JP | 10-373651   | 7/2000  |
| JP | 2000194635  | 7/2000  |
| JP | 2000194638  | 7/2000  |
| JP | 2000194763  | 7/2000  |
| WO | 9515649     | 6/1995  |

OTHER PUBLICATIONS

M. Fox, et al., "The Integrated Supply Chain Management System", Internet Citation, Dec. 7, 1993, pp. 1–11.

* cited by examiner

Primary Examiner—David Wiley
Assistant Examiner—Phuoc H. Nguyen
(74) Attorney, Agent, or Firm—Antonelli, Terry, Stout & Kraus, LLP

(57) ABSTRACT

A delivery schedule management method of managing delivery schedule of delivery data in an electronic data in an electronic data in an electronic data distribution system. The system connects a delivery data server for inputting the delivery data, a digitization server for digitizing the delivery data, a storage and management server for storing and managing electronic delivery data, a delivery management sever for managing delivery of the electronic delivery data, and an electronic user terminal for receiving delivered electronic data and treating received electronic data to one another through a network.

5 Claims, 44 Drawing Sheets

FIG. 23

START BOOK EVALUATION PROGRAM (PUBLISHER SERVER)

1030 — WAS BOOK EVALUATION PROGRAM 103 CALLED FROM USER'S INPUT RECEIVING PROGRAM 102? — YES

1031: WEIGHTS OF TELEVISION(1311), NEWSPAPER(1312), RADIO(1313), MAGAZINE(1314) AND HANGING POSTER(1315) AND WEIGHTS(1316) OF TOPICALITY OF CONTENTS AND INTRODUCED MASS MEDIA ARE READ OUT FROM EVALUATION REFERENCE TABLE 131 AND STORED IN WORK AREA.

1032: WEIGHTS OF TELEVISION(1311), NEWSPAPER(1312), RADIO(1313), MAGAZINE(1314) AND HANGING POSTER(1315) ARE READ OUT FROM WORK AREA AND BIT STRING OF FIVE BITS RECEIVED FROM USER'S INPUT RECEIVEING PROGRAM 102 IS READ OUT FROM WORK AREA.
EQUATION OF (LEFTMOST BIT OF 5-BIT STRING) × (WEIGHT 1311 OF TELEVISION) + (SECOND BIT FROM LEFT OF 5-BIT STRING) × (WEIGHT 1312 OF NEWSPAPER) + (THIRD BIT FROM LEFT OF 5-BIT STRING) × (WEIGHT 1313 OF RADIO) + (SECOND BIT FROM RIGHT OF 5-BIT STRING) × (WEIGHT 1314 OF MAGAZINE) + (RIGHTMOST BIT OF 5-BIT STRING) × (WEIGHT 1315 OF HANGING POSTER) IS CALCULATED AND CALCULATED RESULT IS STORED IN WORK AREA AS WEIGHT OF WHOLE MASS MEDIA.

1033: WEIGHT(1316) OF TOPICALITY OF CONTENTS AND INTRODUCED MASS MEDIA AND WEIGHT OF WHOLE MASS MEDIA CALCULATED IN ABOVE STEP ARE READ OUT FROM WORK AREA AND TOPICALITY(1325) OF CONTENTS RECEIVED FROM USER'S INPUT RECEIVING PROGRAM 102 IS ALSO READ OUT FROM WORK AREA, SO THAT EQUATION OF (WEIGHT OF WHOLE MASS MEDIA) + (WEIGHT 1316 OF TOPICALITY OF CONTENTS AND INTRODUCED MASS MEDIA) × (TOPICALITY OF CONTENTS) AND CALCULATED RESULT IS STORED IN WORK AREA AS EVALUATION VALUE(1306) OF BOOK.

1034: EVALUATION VALUE(1306) OF BOOK IS READ OUT FROM WORK AREA AND IS NOTIFIED TO USER' INPUT RECEIVING PROGRAM 102.

END BOOK EVALUATION PROGRAM

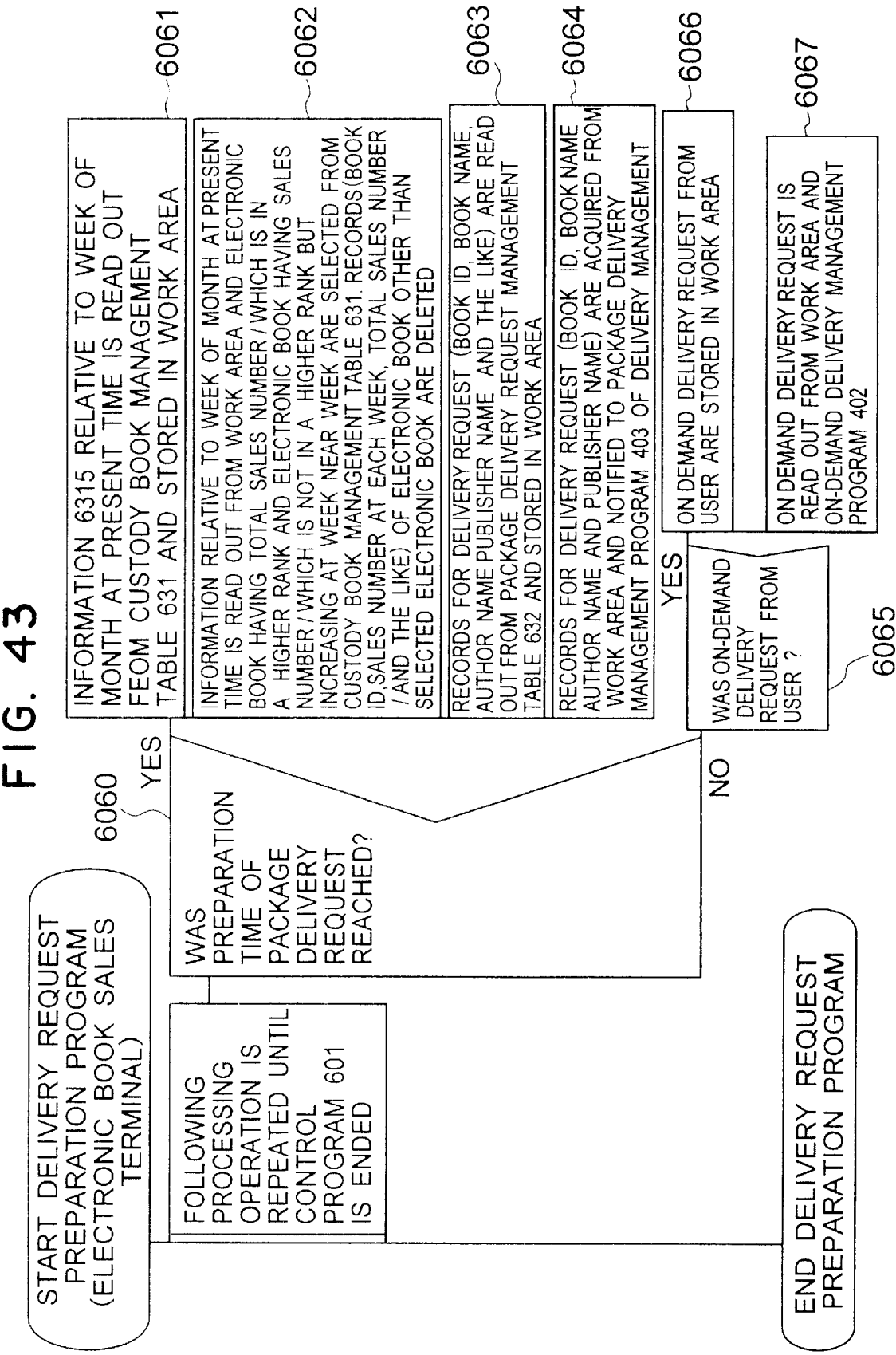

FIG. 44

START USER'S INPUT RECEIVING PROGRAM (ELECTRONIC BOOK SALES TERMINAL)

BOOK NAME (6331), BOOK ID (6332), PUBLISHER NAME (6333) AND AUTHOR NAME (6334) INPUTTED BY USER BY MEANS OF INPUTTING AND SETTING PICTURE 633 OF PACKAGE DELIVERY REQUEST ARE RECEIVED AND STORED IN WORK AREA ⎯ 6020

WAS SETTING BUTTON PUSHED? ⎯ 6021

YES

BOOK NAME (6331), BOOK ID (6332), PUBLISHER NAME (6333) AND AUTHOR NAME (6334) ARE READ OUT FROM WORK AREA AND STORED IN PACKAGE DELIVERY EQUEST MANAGEMENT TABLE 632 ⎯ 6022

END USER'S INPUT RECEIVING PROGRAM

DELIVERY SCHEDULE MANAGEMENT METHOD, APPARATUS FOR IMPLEMENTING THE METHOD, PROCESSING PROGRAM THEREOF AND MEDIUM HAVING THE PROGRAM RECORDED THEREIN

CROSS-REFERENCES TO RELATED APPLICATIONS

This application is related to application Ser. No. 09/473,275, filed Dec. 28, 1999, corresponding to Japanese Patent Application No. 10-373649, filed on Dec. 28, 1998, and the content of which is incorporated herein by reference in its entirety.

This application is related to application Ser. No. 09/473,298, filed Dec. 28, 1999, corresponding to Japanese Patent Application No. 10-373650, filed on Dec. 28, 1998, and the content of which is incorporated herein by reference in its entirety.

This application is related to application Ser. No. 09/473,277, filed Dec. 28, 1999, corresponding to Japanese Patent Application No. 10-373651, filed on Dec. 28, 1998, and the content of which is incorporated herein by reference in its entirety.

BACKGROUND OF THE INVENTION

The present invention relates to a delivery schedule management method of managing delivery schedule in case where digital data to be distributed are delivered, to an apparatus for implementing the method, to a processing program thereof, and to a medium having the processing program recorded therein. More particularly, the present invention relates to a technique that is effectively applied to a delivery schedule management method and apparatus in which electronic books are previously stored in electronic book sales terminal connected through a network in an electronic data distribution system which connects a delivery data server for inputting delivery data, a digitization server for digitizing the delivery data, a storage and management server for storing and managing electronic delivery data, a delivery management server for managing the delivery of the electronic delivery data, and an electronic user terminal for receiving the delivered electronic data and treating the received electronic data to one another through the network, to a processing program thereof, and to a medium recording the processing program.

Recently, the digitization of information to be distributed is widely spread. The information to be distributed is named digital contents such as book data, music data, game programs and data for databases. As a delivery system of such digital contents, there is a "Digital Delivery System" disclosed in JP-A-9-204378, for example. The "Digital Delivery System" is a system in which digital titles (digital contents) are delivered from a central management apparatus to terminals. In order to deliver the digital titles exactly, promptly and inexpensively in accordance with user's taste, the digital titles are previously delivered from the central management apparatus to the terminals. At this time, the previously delivered digital titles are to be determined by a program in the central management apparatus in accordance with marketing information provided to the central management apparatus from the terminals, and mainly include digital titles having high frequency in use.

Further, JP-A-8-272859 discloses a "Stock Price Data Transmission System". The "Stock Price Data Transmission System" transmits real stock price data and past stock price data for only stocks having prices not fluctuated sharply, of restricted past stock price data with respect to transmission of past stock price data used for recovery, so that an amount of data transmitted through a network can be reduced. In this case, the reason why the stock price data fluctuated sharply is not transmitted is that even if transmission of the stock price data fluctuated sharply is interrupted to some extent, next stock price data thereof is produced in a moment and accordingly this next stock price data may be transmitted as the real stock price data.

SUMMARY OF THE INVENTION

There is a problem that the conventional data delivery method can be applied only to certain specific objects to be delivered (digital contents).

It is an object of the present invention to provide a delivery schedule management method and apparatus for managing delivery schedule of digital contents.

It is another object of the present invention to provide a technique capable of improving delivery efficiency and utilization efficiency of digital contents.

It is further another object of the present invention to provide a delivery schedule method and apparatus for managing delivery schedule in case where an electronic book previously stored in an electronic book sales terminal connected through a network are delivered.

The above and other objects and novel features of the present invention will be apparent from the following detailed description and the accompanying drawings.

The representative inventions of the present invention disclosed in this application are now described in brief.

(1) A delivery schedule management method of managing delivery schedule of delivery data in an electronic data distribution system which connects a delivery data server for inputting the delivery data, a digitization server for digitizing the delivery data, a storage and management server for storing and managing electronic delivery data, a delivery management server for managing delivery of the electronic delivery data, and an electronic user terminal for receiving delivered electronic data and treating received electronic data to one another through a network.

(a) The delivery schedule management method comprises the steps of:

setting an evaluation value of the delivery data to be digitized, in the delivery data server;

digitizing the delivery data and the evaluation value, and registering the digitized delivery data and the digitized evaluation value in the storage and management server, in the digitization server;

performing a processing of electronic utilization data selected by a user between the delivery management server and the electronic user terminal;

managing information of the processed electronic utilization data in the delivery management server;

producing an on-demand delivery request at a stage that the electronic user terminal acquires actual electronic data after processing the electronic utilization data, and transmitting the on-demand delivery request to the delivery management server, in the electronic user terminal;

performing management (scheduling) of the on-demand delivery request, transmitting the management (scheduling) of the on-demand delivery request to the storage and management server, acquiring relevant electronic data based on the management (scheduling) of the delivery request, and transmitting the relevant electronic data to the delivery management server, in the delivery management server which acquires the on-demand delivery request; and delivering the relevant electronic data to the electronic user terminal from the delivery management server.

(b) The delivery schedule management method comprises the steps of:

performing disk management and a delivery request (production of a delivery request according to utilization tendency of delivery data) peculiar to the electronic user terminal, and transmitting information thereof to the delivery management server, in the electronic user terminal;

performing management (scheduling) of the delivery request, transmitting the management (scheduling) of the delivery request to the storage and management server, acquiring relevant electronic data based on the management (scheduling) of the delivery request from the storage and management server, and transmitting the relevant electronic data to the delivery management server, in the delivery management server which acquires the delivery request; and delivering the relevant electronic data to the electronic user terminal from the delivery management server.

(c) The delivery schedule management method comprises the steps of:

setting an evaluation value of the delivery data to be digitized, in the delivery data server;

digitizing the delivery data and the evaluation value, and register the digitized delivery data and the digitized evaluation value in the storage and management server, determining and reading data to be previously delivered to the electronic user terminal, based on a delivery request of the electronic user terminal acquired through the delivery management server, delivery data treating information and the evaluation value of the delivery data from the digitization server, and transmitting the data to the delivery management server, in the digitization server; and delivering the data to the electronic user terminal from the delivery management server.

(d) The delivery schedule management method comprises the steps of:

setting an evaluation value of the delivery data to be digitized, in the delivery data server;

determining and reading data to be previously delivered to the electronic user terminal, based on a delivery request of the electronic user terminal acquired through the delivery management server, delivery data treating information and the evaluation value of the delivery data from the digitization server, in the storage and management server; and performing disk management and production of a delivery request according to utilization tendency of the delivery data of the electronic user terminal, in the electronic user terminal.

(2) A delivery schedule management apparatus for managing delivery schedule of delivery data in an electronic data distribution system which connects a delivery data server for inputting the delivery data, a digitization server for digitizing the delivery data, a storage and management server for storing and managing electronic delivery data, a delivery management server for managing delivery of the electronic delivery data, and an electronic user terminal for receiving delivered electronic data and treating received electronic data to one another through a network, wherein the delivery data server comprises means for evaluating the delivery data;

the storage and management server comprises means for determining and reading information of electronic data to be delivered, based on the evaluation of the delivery data, object treating information and a delivery request, the object treating information and the delivery request being acquired through the delivery management server; and the electronic user terminal comprises means for managing a disk peculiar to the electronic user terminal, and means for producing the delivery request in accordance with an electronic data treating tendency in the electronic user terminal.

(3) The storage and management server comprises:

a delivery data evaluation value table for managing an evaluation value of the delivery data by the delivery data server;

a ranking information management table produced based on the delivery request and the delivery data treating information of the electronic user terminal from the delivery management server; and a delivery request management table for managing the delivery requests from the delivery management server.

(4) A delivery schedule management method of managing delivery schedule of delivery data in an electronic book sales system which connects a publisher server for inputting delivery data of book, a digitization server for digitizing the delivery data of book, a storage and management server for performing storage and management of the digitized electronic data of book (electronic book) and sales information management in the whole system, a delivery management server for performing delivery management of the electronic book, a satellite delivery server for delivering the electronic book, and an electronic book sales terminal for selling the electronic book to one another through a network.

(a) The delivery schedule management method comprises a step of setting an evaluation value of a book to be digitized, in the publisher server.

(b) The delivery schedule management method comprises a step of performing disk management and production of a delivery request in accordance with a sales tendency of the electronic book in the electronic book sales terminal.

(c) The delivery schedule management method comprises the steps of:

previously determining and transmitting the electronic book to be delivered to the electronic book sales terminals, based on the delivery request and sales information of the electronic book sales terminal acquired through the delivery management server and the evaluation value of book from the publisher server; and providing the electronic book satisfying user's taste (request) promptly in the electronic book sales terminal.

(d) The delivery schedule management method comprises the steps of: in the publisher server, setting an evaluation value of a book to be digitized;

performing disk management and production of a delivery request in accordance with a sales tendency of the electronic book in the electronic book sales terminal;

previously determining and transmitting the electronic book to be delivered to the electronic book sales terminal, based on the delivery request and sales information of the electronic book sales terminal acquired through the delivery management server and the evaluation value of the book from the publisher server; and providing the electronic book satisfying user's taste (request) promptly in the electronic book sales terminal.

(5) A delivery schedule management apparatus for managing delivery schedule of delivery data in an electronic book sales system which connects a publisher server for inputting delivery data of book, a digitization server for digitizing the delivery data of book, a storage and management server for performing storage and management of the digitized electronic data of book (electronic book) and sales information management in the whole system, a delivery management server for performing delivery management of the electronic book, a satellite delivery server for delivering the electronic book, and an electronic book sales terminal for selling the electronic book to one another through a network, comprising means for setting an evaluation value of a book to be digitized in the publisher server;

means for performing disk management and production of a delivery request in accordance with a sales tendency of the electronic book in the electronic book sales terminal; and means for previously reading the electronic book to be delivered to the electronic book sales terminals, based on the delivery request and sales information of the electronic book sales terminal acquired through the delivery management server, and the evaluation value of the book from the digitization server.

The storage and management server comprises:

a recommended book guidance table for managing the evaluation value of the electronic book by the digitization server;

a ranking information management table produced from the sales information from the delivery management server; and a delivery request table for managing the delivery request from the delivery management server.

BRIEF DESCRIPTION OF THE DRAWINGS

FIG. 23 is a PAD diagram showing a structure and contents of a book evaluating program in the publisher server in the embodiment;

FIG. 43 is a PAD diagram showing a structure and contents of a delivery request production program in the electronic book sales terminal in the embodiment; and FIG. 44 is a PAD diagram showing a structure and contents of a user's input receiving program in the electronic book sales terminal in the embodiment.

DESCRIPTION OF THE PREFERRED EMBODIMENTS

Embodiments of the present invention is now described in detail with reference to the accompanying drawings.

Figure 1:
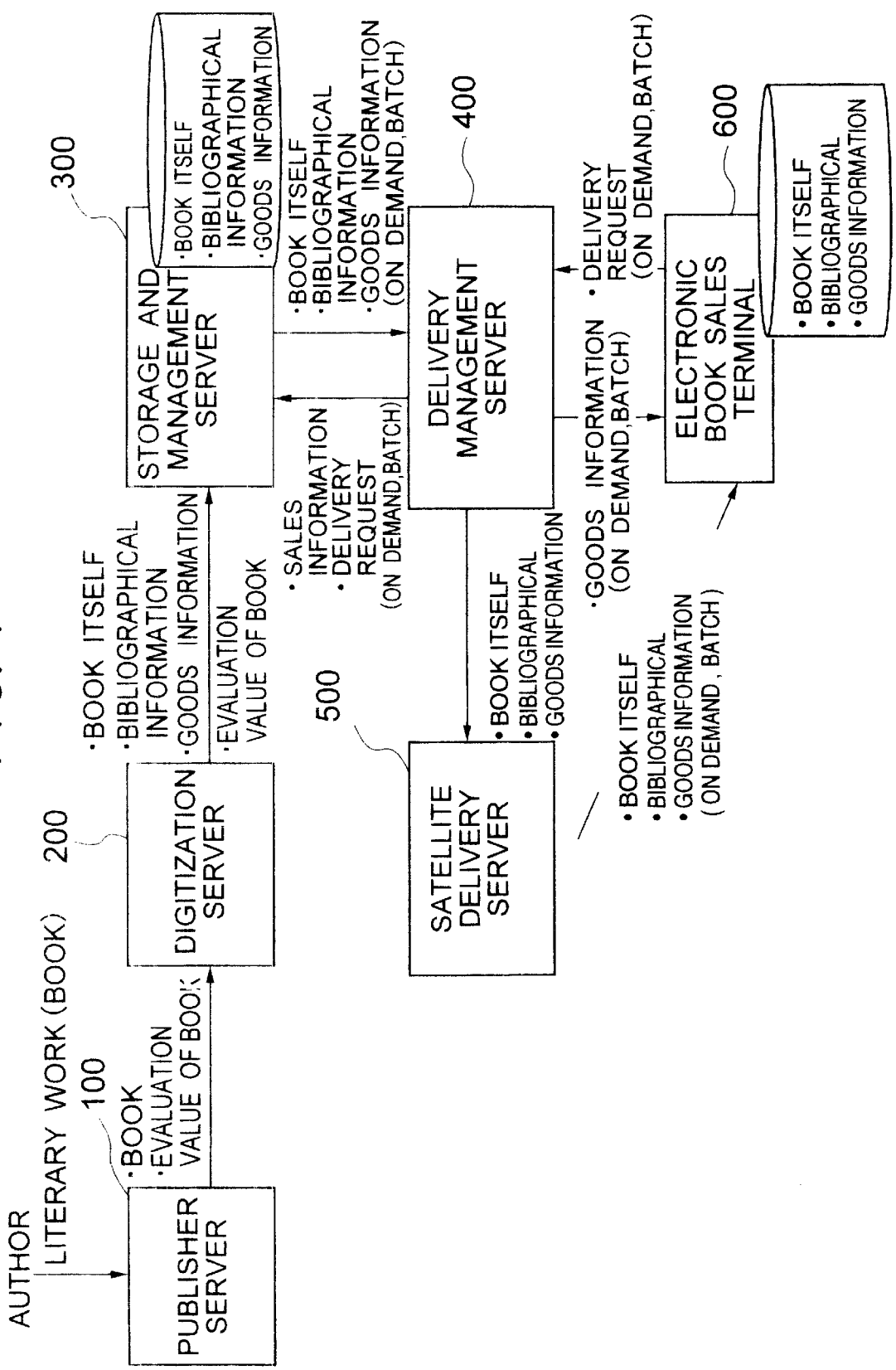
FIG. 1 is a block diagram schematically illustrating an electronic book distribution and sales system of an embodiment to which a delivery schedule management method according to the present invention is applied.

FIG. 1 is a block diagram schematically illustrating an electronic book distribution and sales system of an embodiment to which a delivery schedule management method according to the present invention is applied.

In the electronic book distribution and sales system of the embodiment, a publisher server 100, digitization server 200, a storage and management server (storage and management center) 300, a delivery management server 400, a satellite delivery server (satellite delivery center) 500, and an electronic book sales terminal 600 are connected to one another through a network in order to enhance the efficiency of the delivery schedule management of delivery data, as shown in FIG. 1.

The publisher server 100 calculates an evaluation value of a book, which is written by an author, based on the sales statistics, and transmits the book and the evaluation value thereof to the digitization server 200.

Figure 2:
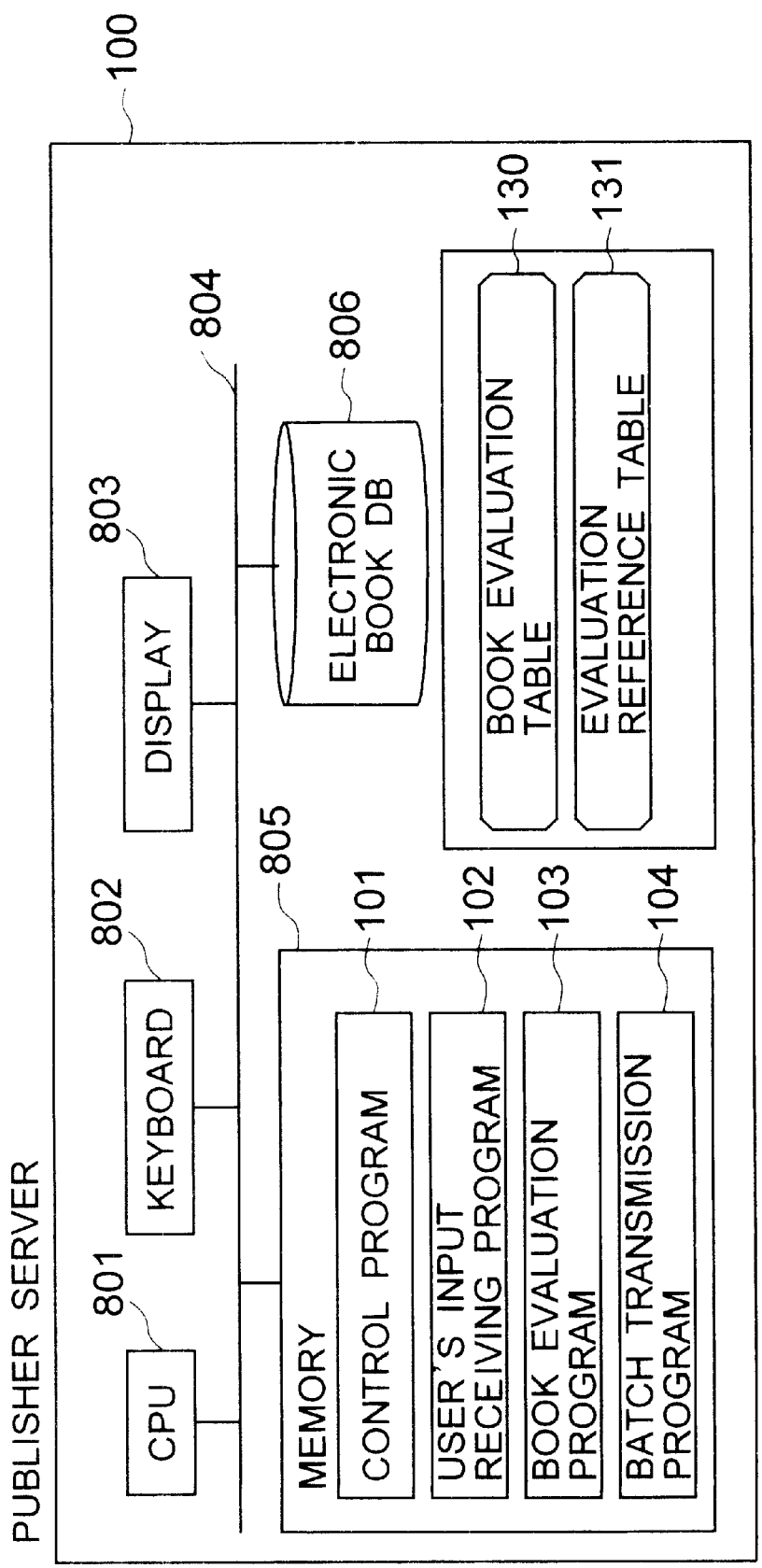
FIG. 2 is a block diagram schematically illustrating a publisher server in the embodiment.

FIG. 2 is a block diagram schematically illustrating the publisher server 100.

The publisher server 100 comprises, as shown in FIG. 2, a central processing unit (CPU) 801, a keyboard 802, a display 803, a bus 804, a memory 805, and an electronic book database 806 which are connected to one another through the bus 804.

The publisher server 100 includes a control program 101, a user's input receiving program 102, a book evaluating program 103, a batch transmission program 104, a book evaluation table 130 and an evaluation reference table 131 which are stored in the memory 805, so as to be able to select data to be delivered in a package based on the evaluation value of each book from the publisher.

The control program 101 of the publisher server 100 activates the user's input receiving program 102, the book evaluating program 103 and the batch transmission program 104 upon starting.

The user's input receiving program 102 in the publisher server 100 displays a picture for setting a recommendation degree of each book before production of electronic books, and produces the book evaluation table 130 in accordance with input information supplied by the user.

The book evaluation program 103 in the publisher server 100 acquires the input information of the user from the user's input receiving program 102, and calculates the evaluation value of the book using the evaluation reference table 131.

The batch transmission program 104 in the publisher server 100 reads out the evaluation value information of each electronic book from the book evaluation table 130 when a batch transmission time is reached, and transmits the evaluation value information to the digitization server 200.

Figure 3:
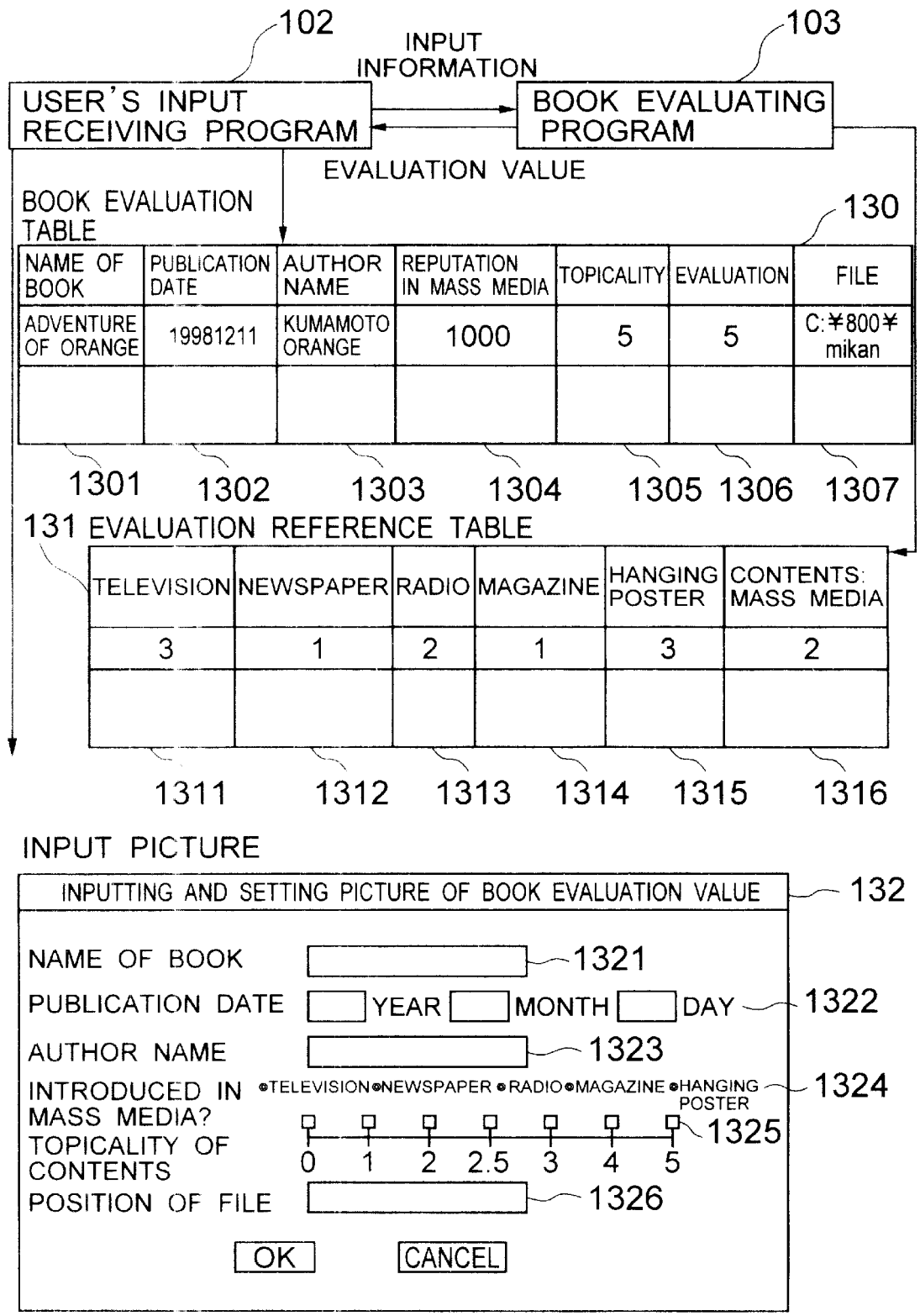
FIG. 3 shows an example of an input picture for input information inputted by a user, a book evaluation table and an evaluation reference table in the embodiment.

An embodiment of an input picture 132 for the user's input information acquired from the book evaluation table 130, the evaluation reference table 131 and the user's input receiving program 102 is shown in FIG. 3.

The digitization server 200 performs the digitization of the book transferred from the publisher server 100 and the definition of the bibliographical information and the goods information, and transfers the book itself, the bibliographical information, the goods information and the evaluation value of the book to the storage and management server 300.

Figure 4:
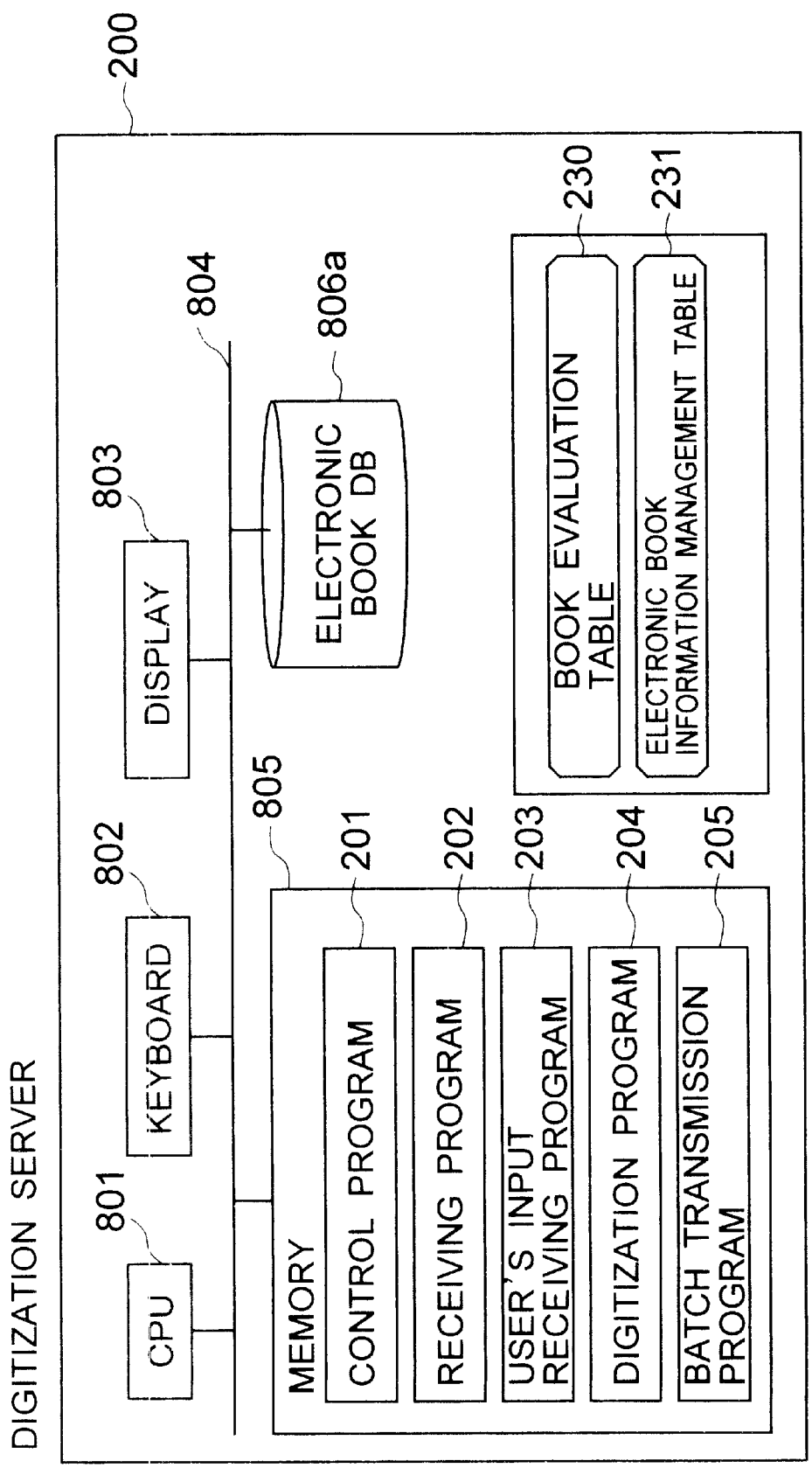
FIG. 4 is a block diagram schematically illustrating a digitization server in the embodiment.

FIG. 4 is a block diagram schematically illustrating the digitization server 200. The digitization server 200 comprises, as shown in FIG. 4, a central processing unit (CPU) 801, a keyboard 802, a display 803, a bus 804, a memory 805 and an electronic book database 806a which are connected to one another through the bus 804.

In order to make the conversion into a format used in the electronic book distribution and sales system of the embodiment, the digitization server 200 includes a control program 201, a receiving program 202, a user's input receiving program, a digitization program 204, a batch transmission program 205, a book evaluation table 230 and an electronic book information management table 231 which are stored in the memory 805.

The control program 201 in the digitization server 200 activates the receiving program 202, the user's input receiving program 203, the digitization program 204, and the batch transmission program 205 upon starting.

When the receiving program 202 receives the contents of the book evaluation table 130 from the batch transmission table 104 of the publisher server 100, the receiving program 202 stores the contents into the book evaluation table 230 in the digitization server 200.

The user's input receiving program 203 displays a picture for causing the user to input the electronic book information, and transmits the input information to the digitization program 204 after completion of user's inputting. When the user's input receiving program 203 receives the digitization end notification from the digitization program 204, the user's input receiving program 203 stores the digitized input information into the electronic book information management table 231.

After the digitization program 204 acquires the user's input information from the user's input receiving program 203, the digitization program 204 performs the existing digitization processing, and transmits the end notification to the user's input receiving program 203.

Figure 5:
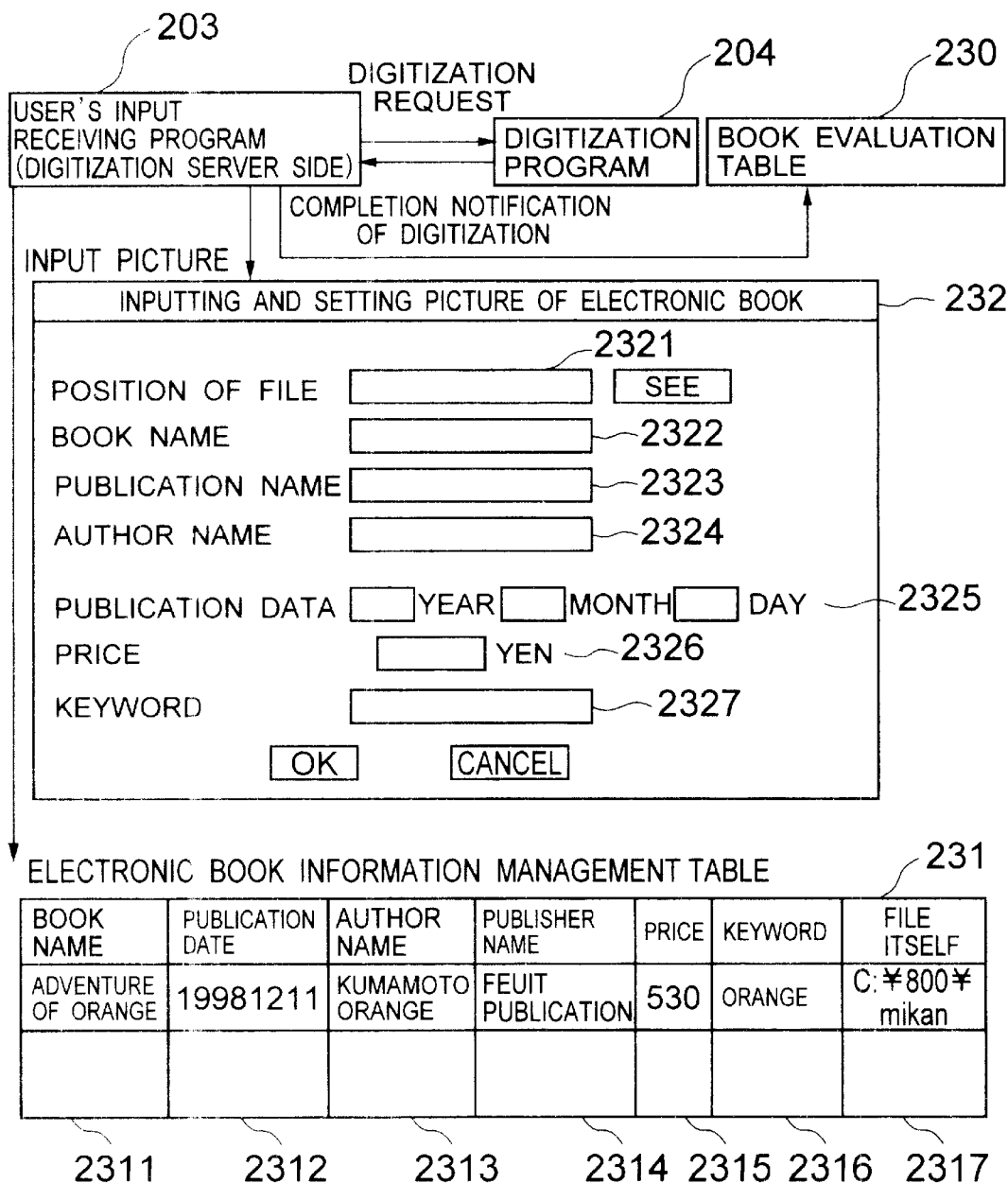
FIG. 5 shows an example of the relation of a user input receiving program and a digitization program, an input picture for input information inputted by a user and an electronic book information management table in the embodiment.

The batch transmission program 205 reads out the electronic book information from the electronic book information management table 231 when a batch transmission time is reached, and transmits the electronic book information to the storage and management server 300. The batch transmission program 205 also reads out the evaluation information of the electronic book from the book evaluation table 230, and transmits the evaluation information to the storage and management server 300. An embodiment of the electronic book information management table 231 and that of an input picture 232 are shown in FIG. 5.

The storage and management server 300 registers the book itself, the bibliographical information, the goods information and the evaluation value of the book from the digitization server 200, and manages the registered book itself, the registered bibliographical information, the registered goods information and the registered book.

Figure 6:
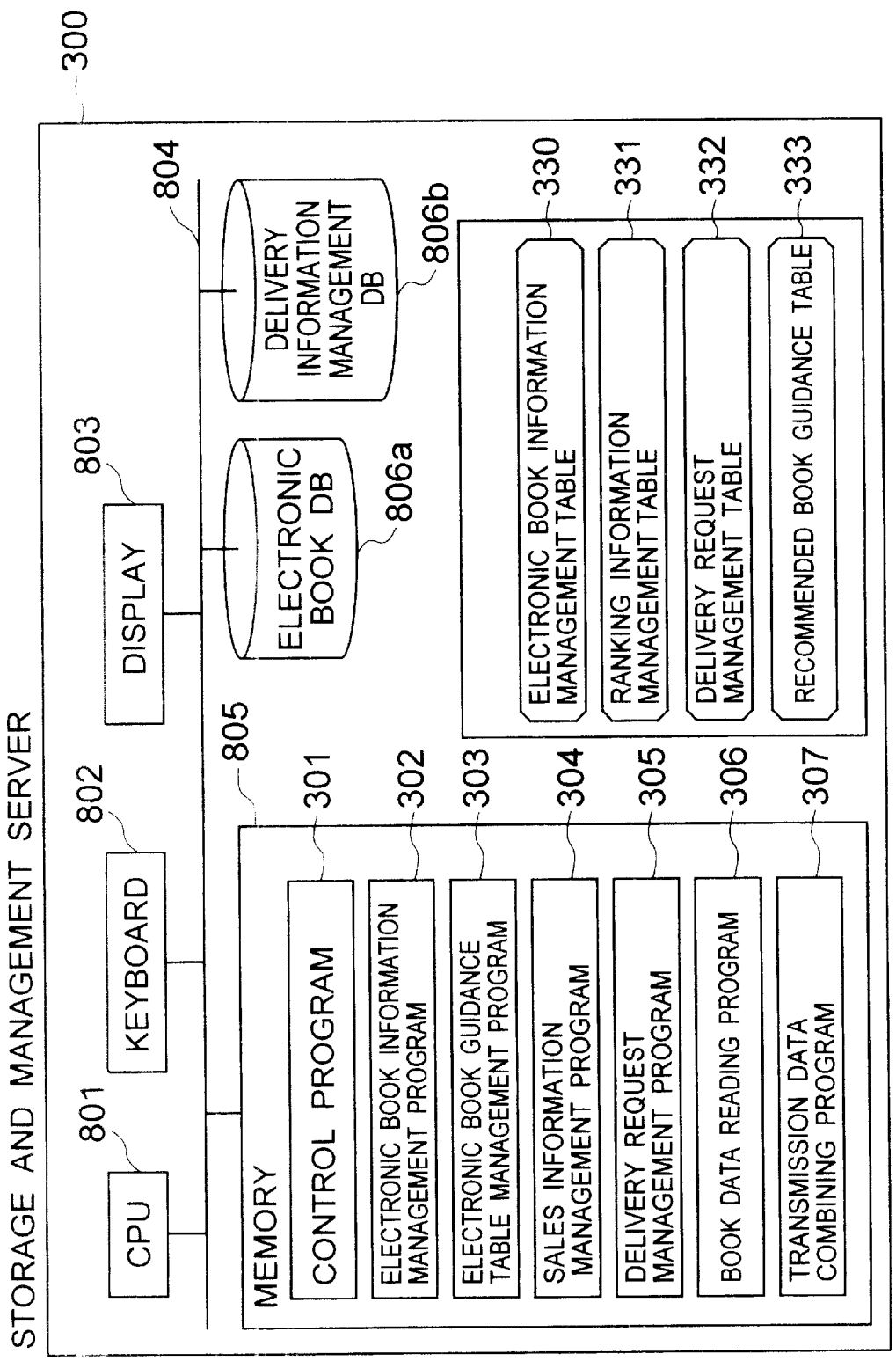
FIG. 6 is a block diagram schematically illustrating a storage and management server (storage and management center) in the embodiment.

FIG. 6 is a block diagram schematically illustrating the storage and management server (storage and management center) 300.

The storage and management server 300 comprises, as shown in FIG. 6, a central processing unit (CPU) 801, a keyboard 802, a display 803, a bus 804, a memory 805, an electronic book database 806a and a delivery information management database 806b which are connected to one another through the bus 804.

In order to storage and manage the electronic book to be sold by the electronic book distribution and sales system of the embodiment, the storage and management server (storage and management center) 300 includes a control program 301, an electronic book information management program 302, an electronic book guidance table management program 303, a sales information management program 304, a delivery request management program 305, a book data reading program 306, a transmission data combining program 307, an electronic book information management table 330, a ranking information management table 331, a delivery request management table 332 and a recommended book guidance table 333 which are stored in the memory 805.

The control program 301 activates the electronic book information management program 302, the electronic book guidance table management program 303, the sales information management program, 304, the delivery request management program 305, the book data reading program 306 and the transmission data combining program 307 upon starting.

When the electronic book information management program 302 receives the electronic book information from the digitization server 200, the electronic book information management table 330 stores the electronic book information in the electronic book information management table 330.

When the electronic book guidance table management program 303 receives the evaluation value information of the electronic book from the digitization server 200, the electronic book guidance table management program 303 stores the evaluation value information in the recommended book guidance table 333.

When the sales information management program 304 receives the sales information from the delivery management server 400, the sales information management program 304 totals the ranking information, and stores the totaled information in the ranking information management table 331.

When the delivery request management program 305 acquires the on-demand delivery request from the delivery management server 400, the delivery request management program 305 issues the request for acquiring the relevant book data to the book data reading program 306, and acquires the data acquisition end notification from the book data reading program 306 to transmit the acquired data to the delivery management server 400.

Further, when the package delivery request is received from the delivery management server 400, the received delivery request information is stored in the delivery request management table 332, and the data acquisition request is issued to the book data reading program 306. After acquisition of the data acquisition end notification from the book data reading program 306, the acquired data is transmitted to the delivery management server 400.

When the book data reading program 306 receives the on-demand delivery request from the delivery request management program 305, the book data reading program 306 reads out the relevant electronic book from the electronic book information management table 330, and transmits it to the transmission data combining program 307. When the data combination end notification is received from the transmission data combining program 307, the data reading end notification and the data are transmitted to the delivery request management program 305 in the storage and management server 300.

Further, when the package delivery request is received from the delivery request management program 305, the electronic book satisfying the particular evaluation value is read out from the recommended book guidance table 333, and is transmitted to the transmission data combining program 307. When the data combination end notification is received from the transmission data combining program 307, the data reading end notification and the data are transmitted to the delivery request management program 305 in the storage and management server 300.

When the transmission data combining program 307 in the storage and management server 300 receives the combination request from the book data reading program 306, the program 307 performs the combination processing of the designated electronic book, and transmits the combination end notification and the combined data to the book data reading program 306.

Figure 7:
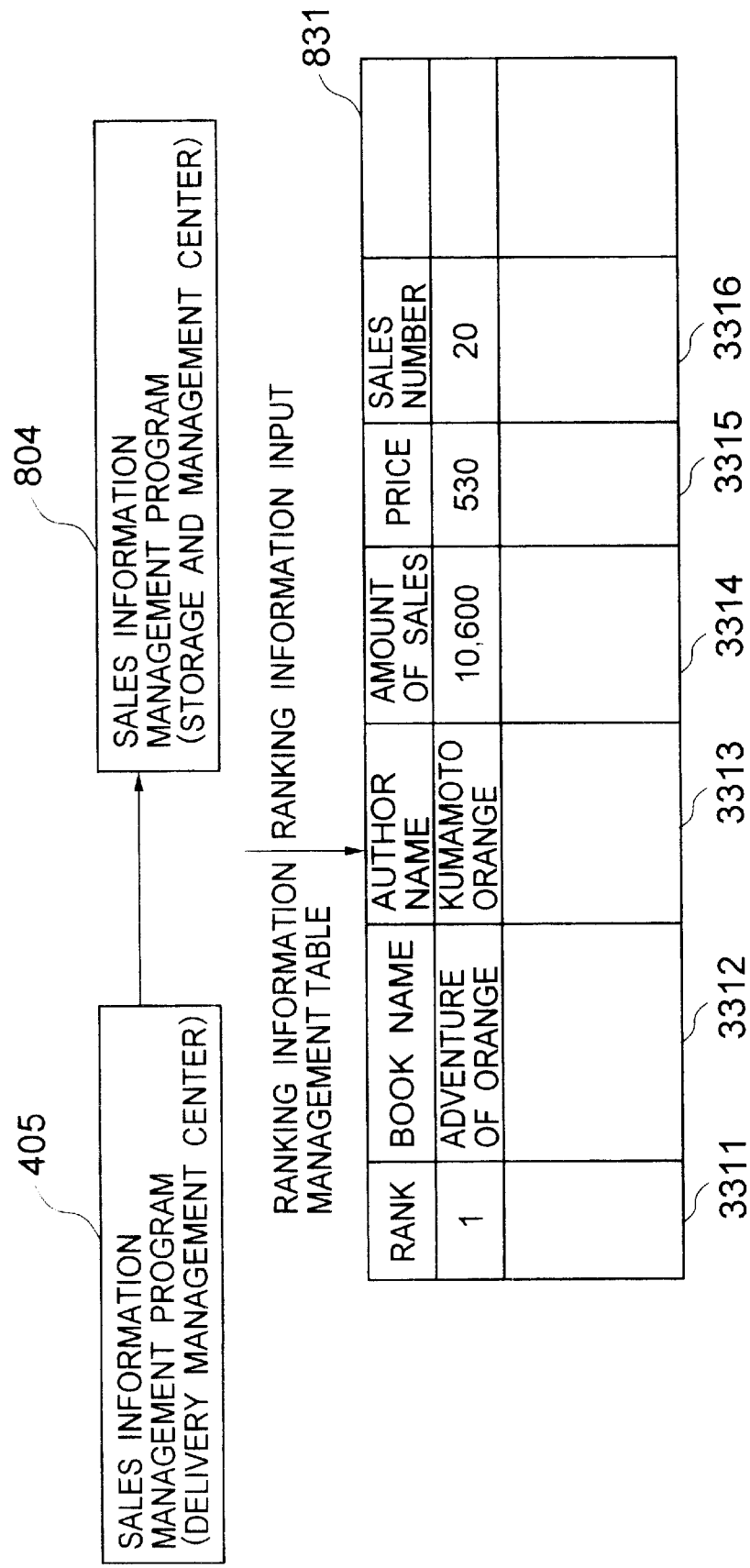
FIG. 7 shows an example of the relation of a sales information management program and a ranking information management table in the embodiment.
Figure 8:
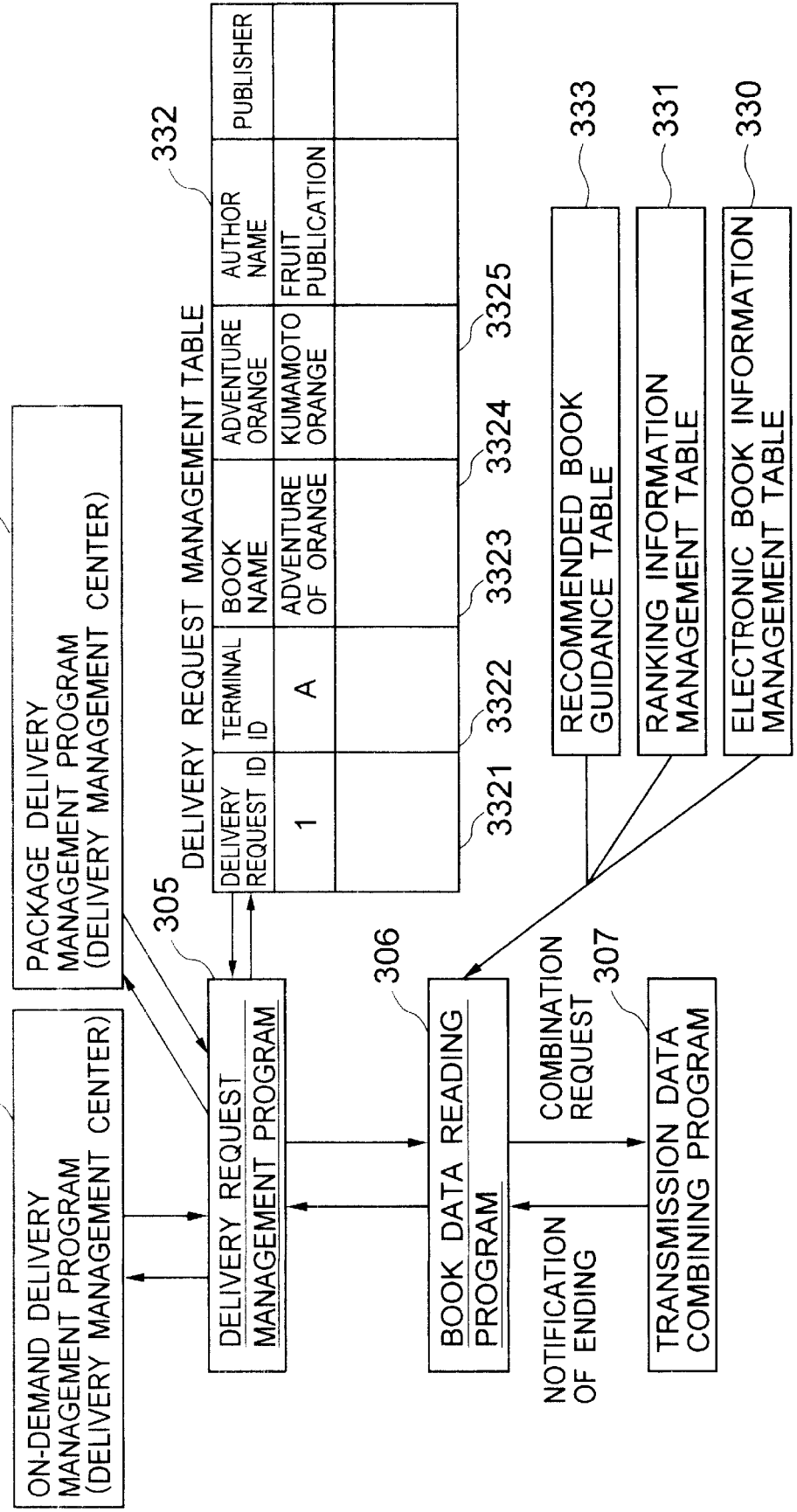
FIG. 8 shows an example of the relation of a delivery request management program, a book data reading program and a transmission data combining program, and a delivery request management table in the embodiment.
Figure 9:
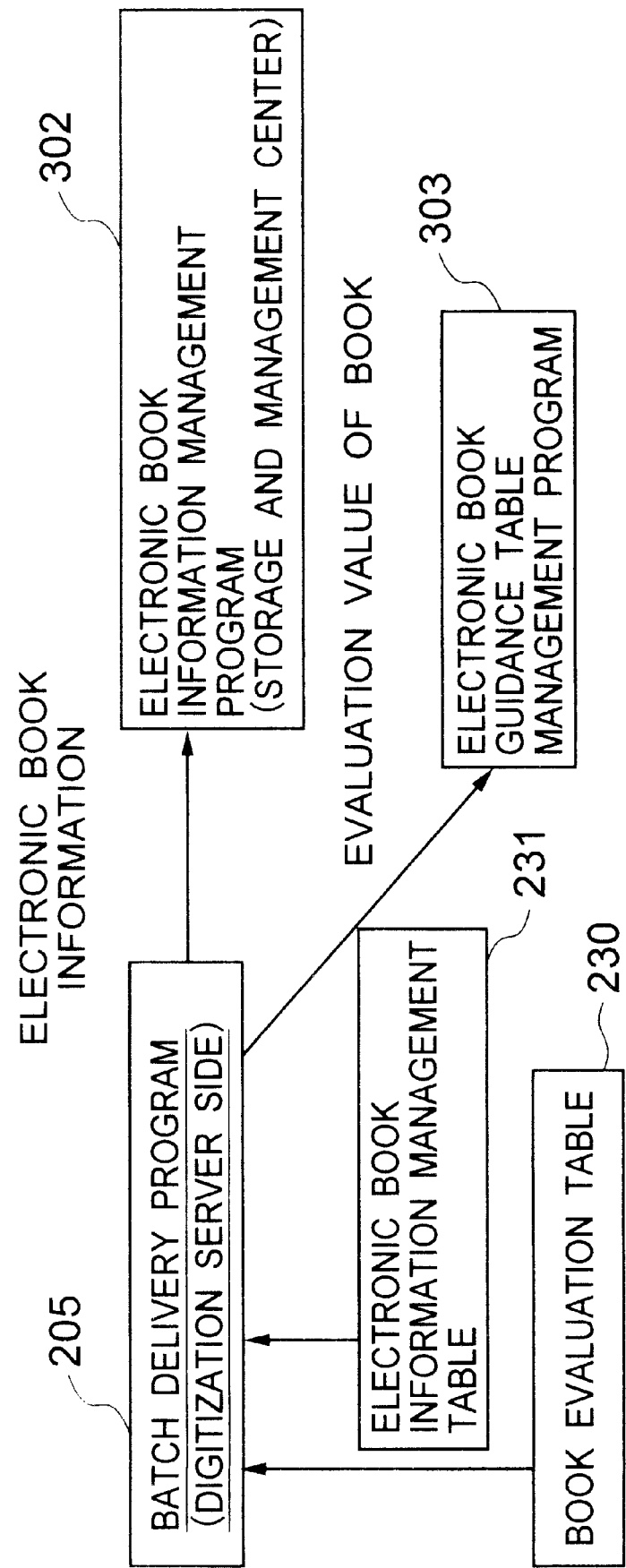
FIG. 9 illustrating the relation of a batch transmission program, an electronic book information management program and an electronic book guidance table management program in the embodiment.
Figure 10:
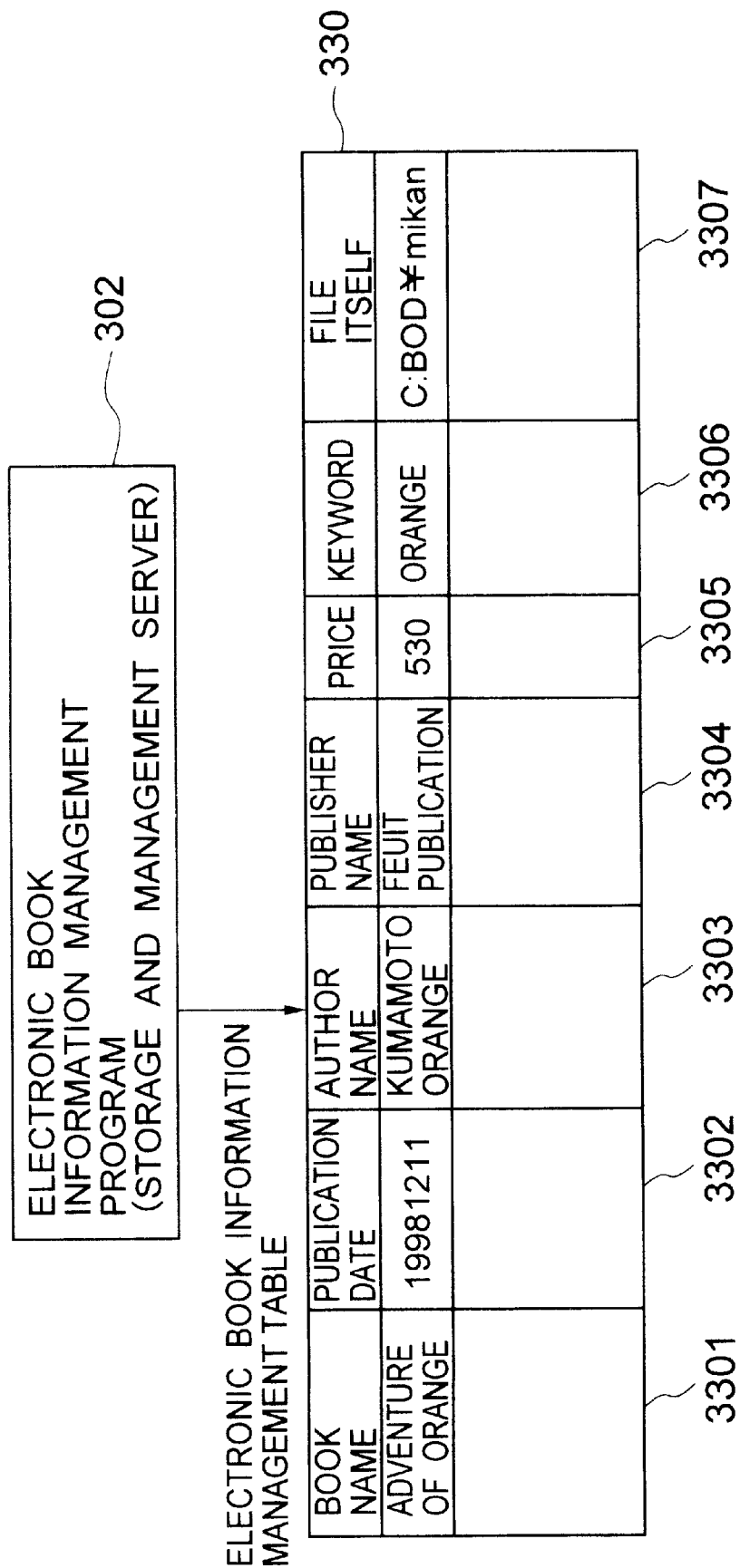
FIG. 10 shows an example of the electronic book information management table and the electronic book information management program in the embodiment.
Figure 11:
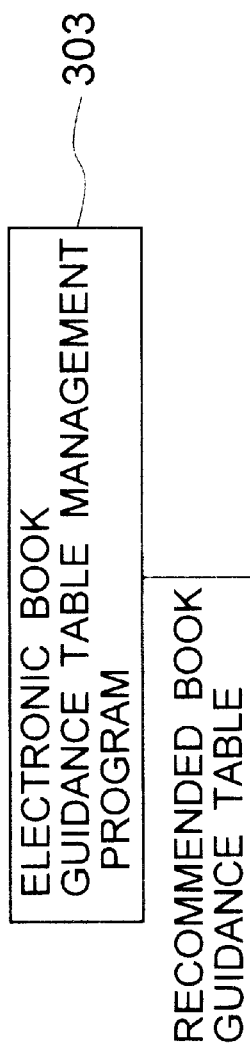
FIG. 11 shows an example of a recommended book guidance table and the electronic book information guidance table management program in the embodiment.
Figure 31:
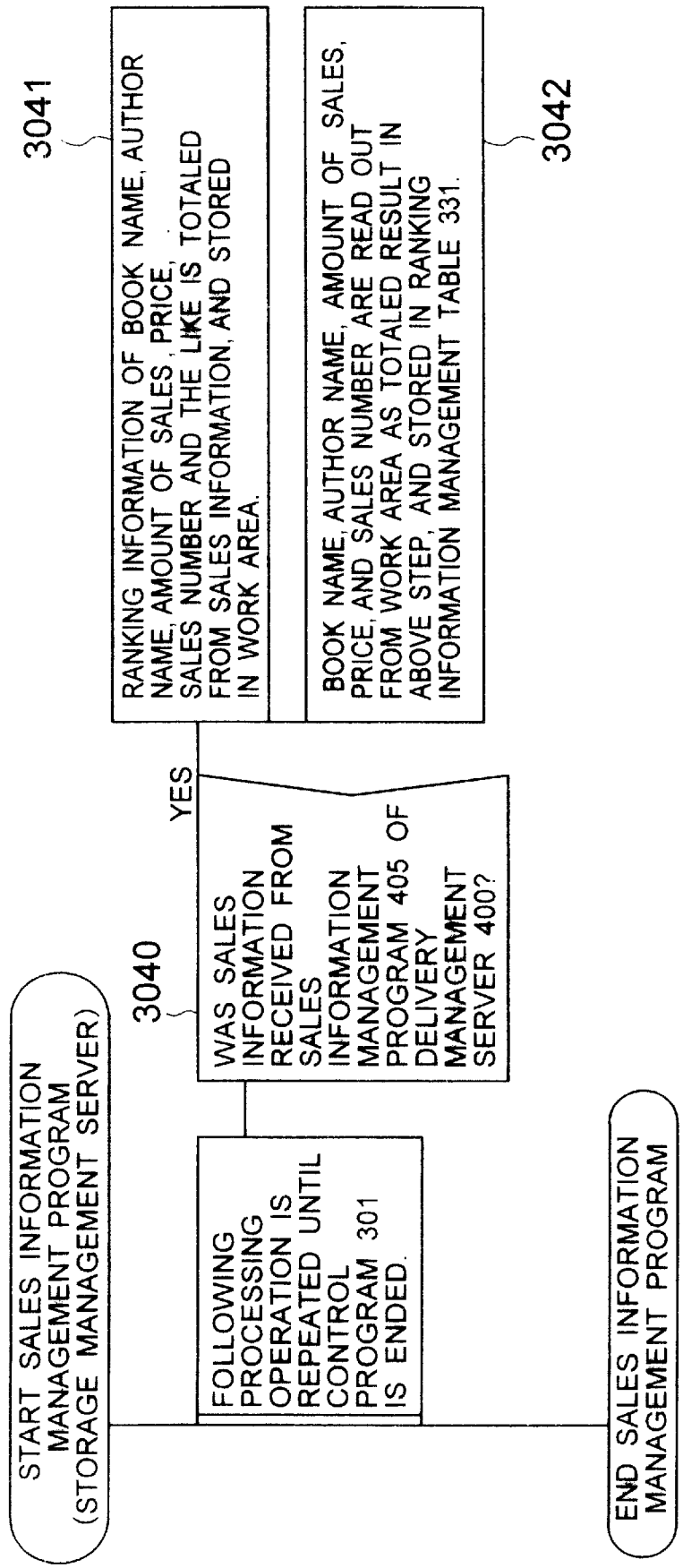
FIG. 31 is a PAD diagram showing a structure and contents of a sales information management program in the storage and management server in the embodiment.
Figure 33:
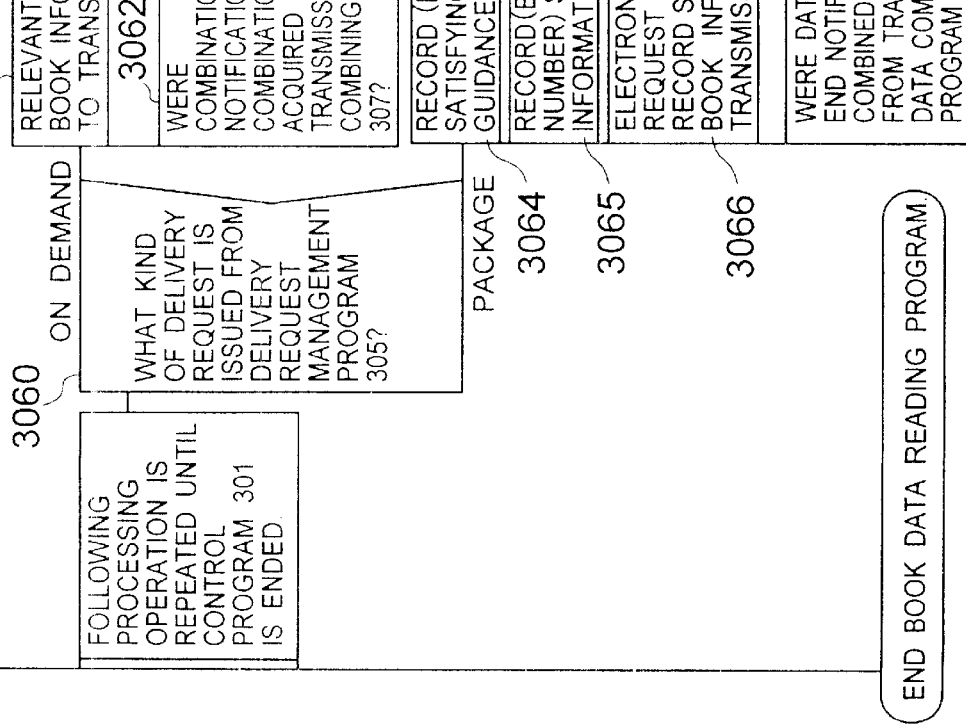
FIG. 33 is a PAD diagram showing a structure and contents of a book data reading program in the storage and management server in the embodiment.
Figure 34:
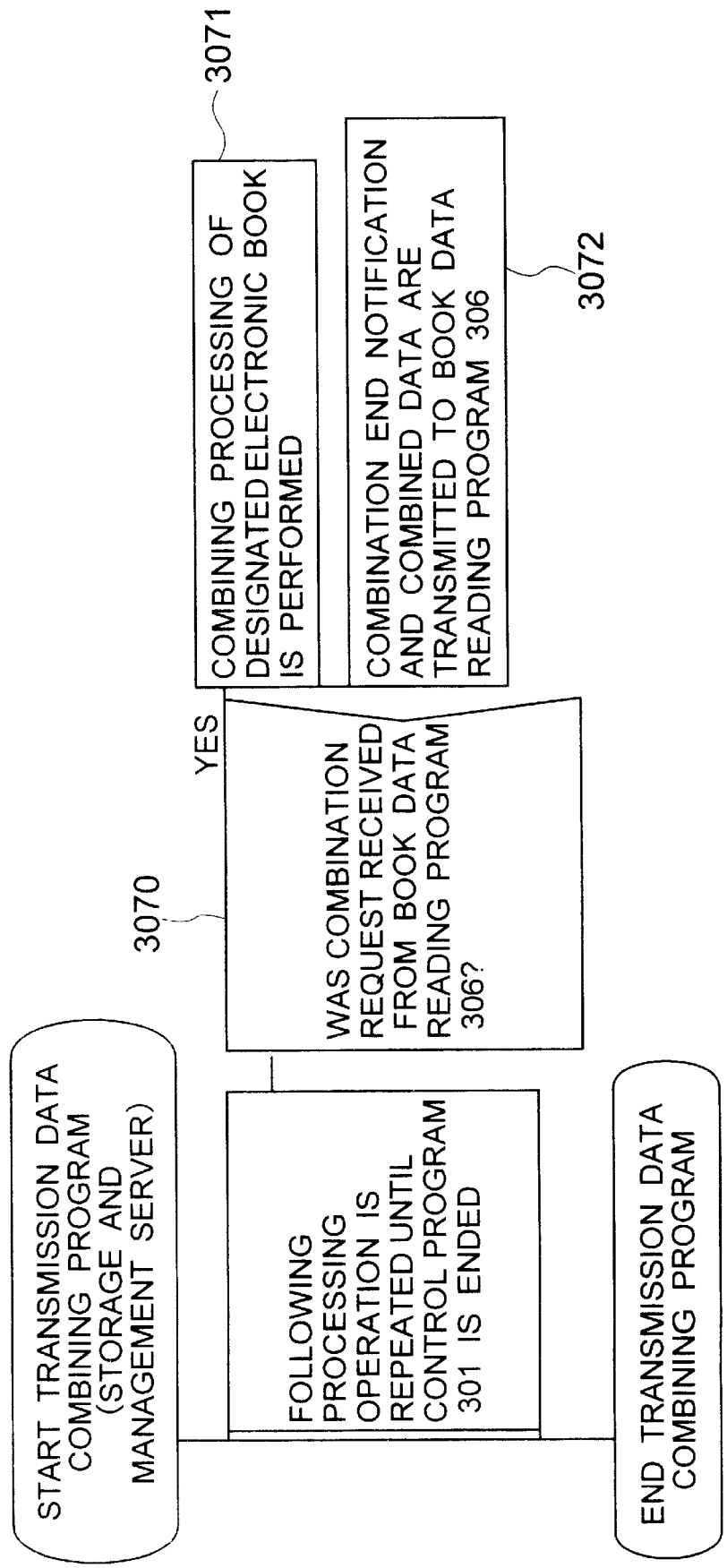
FIG. 34 is a PAD diagram showing a structure and contents of a transmission data combining program in the storage and management server in the embodiment.

FIGS. 7 and 31 show an embodiment of the ranking information management table 331 and a PAD diagram of the sales information management program 304. FIGS. 8, 33 and 34 show an embodiment of the delivery request management table 332 and PAD diagrams of the book data reading program 306 and the transmission data combining program 307.

FIGS. 10, 11, 29 and 30 show embodiments of the electronic book information management table 330 and the recommended book guidance table 333 and PAD diagrams of the electronic book information management program 302 and the electronic book guidance table management table 303.

Figure 12:
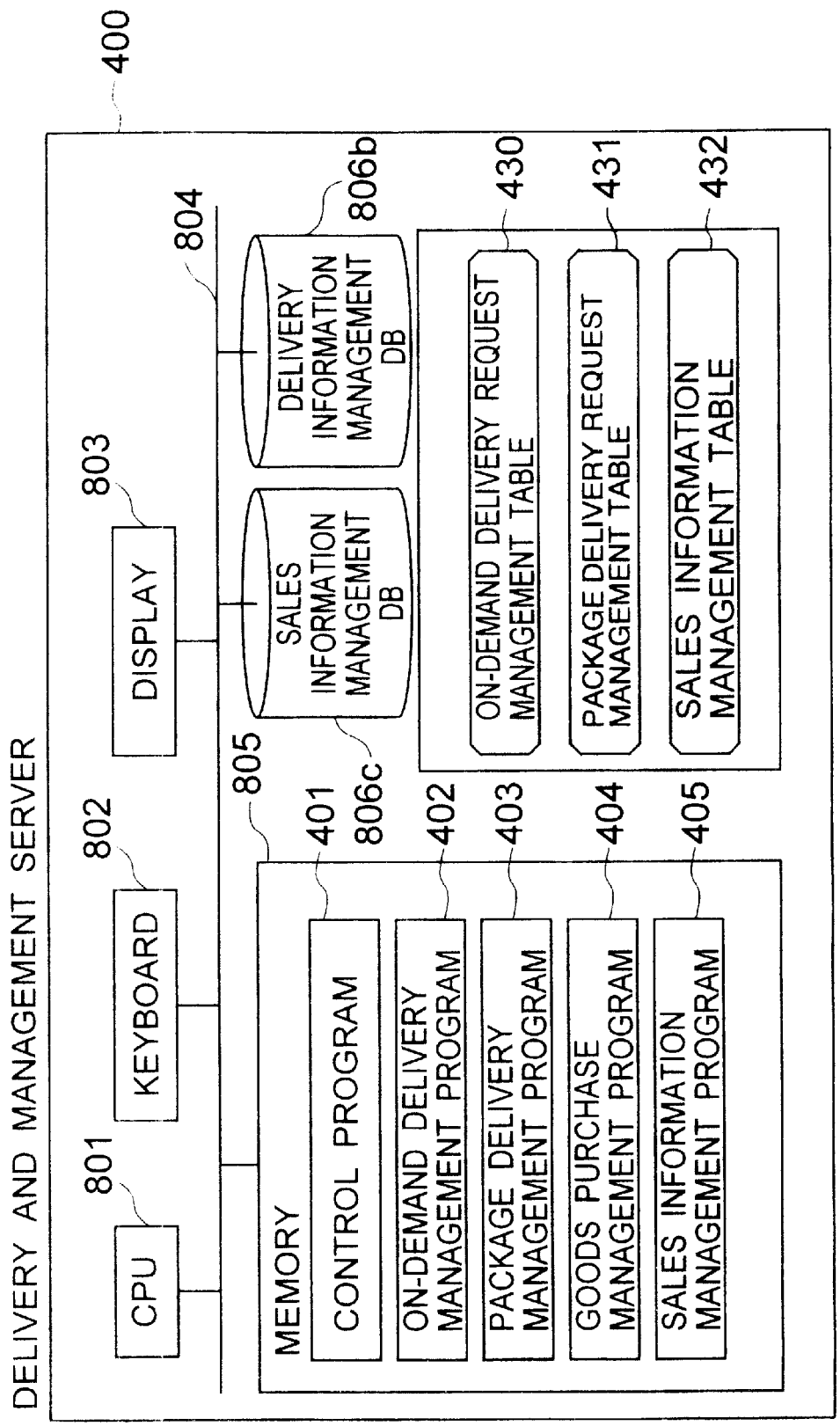
FIG. 12 is a block diagram schematically illustrating a delivery management server in the embodiment.

FIG. 12 is a block diagram schematically illustrating the delivery management server 400. The delivery management server 400 comprises, as shown in FIG. 12, a central processing unit (CPU) 801, a keyboard 802, a display 803, a bus 804, a memory 805, a delivery information management database 806b and a sales information management database 806c which are connected to one another through the bus 804.

In order to distribute the electronic book in the electronic book distribution and sales system of the embodiment, the delivery management server 400 includes a control program 401, an on-demand delivery management program 402, a package delivery management program 403, a goods purchase management program 404, a sales information management program 405, an on-demand delivery request management table 430, a package delivery request management table 431 and a sales information management table 432 which are stored in the memory 805.

The control program 401 of the delivery management server 400 activates the on-demand delivery management program 402, the package delivery management program 403, the goods purchase management program 404 and the sales information management program 405 upon starting.

When the on-demand delivery management program 402 of the delivery management server 400 receives the on-demand delivery request from the electronic book sales terminal, the on-demand delivery management program 402 stores the delivery request in the on-demand delivery request management table 430, and transmits the delivery request to the storage and management server 300. When the end notification and delivery data are received from the storage and management server 300, the received data is transmitted to the satellite delivery server 500, and the relevant delivery request is deleted from the on-demand delivery request management table 430.

When the package delivery management program 403 of the delivery management server 400 receives the package delivery request from the electronic book sales terminal 600, the package delivery management program 403 stores the delivery request in the package delivery request management table 431, and transmits the delivery request to the storage and management server 300. When the package delivery management program 403 receives the end notification and delivery data from the storage management server 300, the package delivery management program 403 transmits the received data to the satellite delivery server 500, and deletes the relevant delivery request from the package delivery request management table 431.

When the goods purchase management program 404 of the delivery management server 400 receives the purchase request from the electronic book sales terminal 600, the goods purchase management program 404 performs the existing purchase processing. After completion of the purchase processing, the goods purchase management program 404 notifies the purchase contents to the sales information management program 405, and terminates the purchase processing with the electronic book sales terminal 600.

When the sales information management program 405 of the delivery management server 400 is notified of the purchase contents from the goods purchase management program 404, the sales information management program 405 stores the sales information to the sales information management table 432.

The delivery management server 400 acquires the on-demand delivery request and the package delivery request from each electronic book sales terminal 600, and performs the schedule management of the delivery requests to issue the delivery requests to the storage and management server (storage and management center) 300. Thereafter, the delivery and management server 400 receives the book itself, the bibliographical information and the goods information relevant to the delivery requests from the storage and management server 300, and transmits the book itself and the bibliographical information to the satellite delivery server (satellite delivery center) 500 and the goods information to the electronic book sales terminal.

The satellite delivery server 500 which receives the book itself and the bibliographical information transmitted from the delivery management server 400 transmits the information through the satellite.

Figure 13:
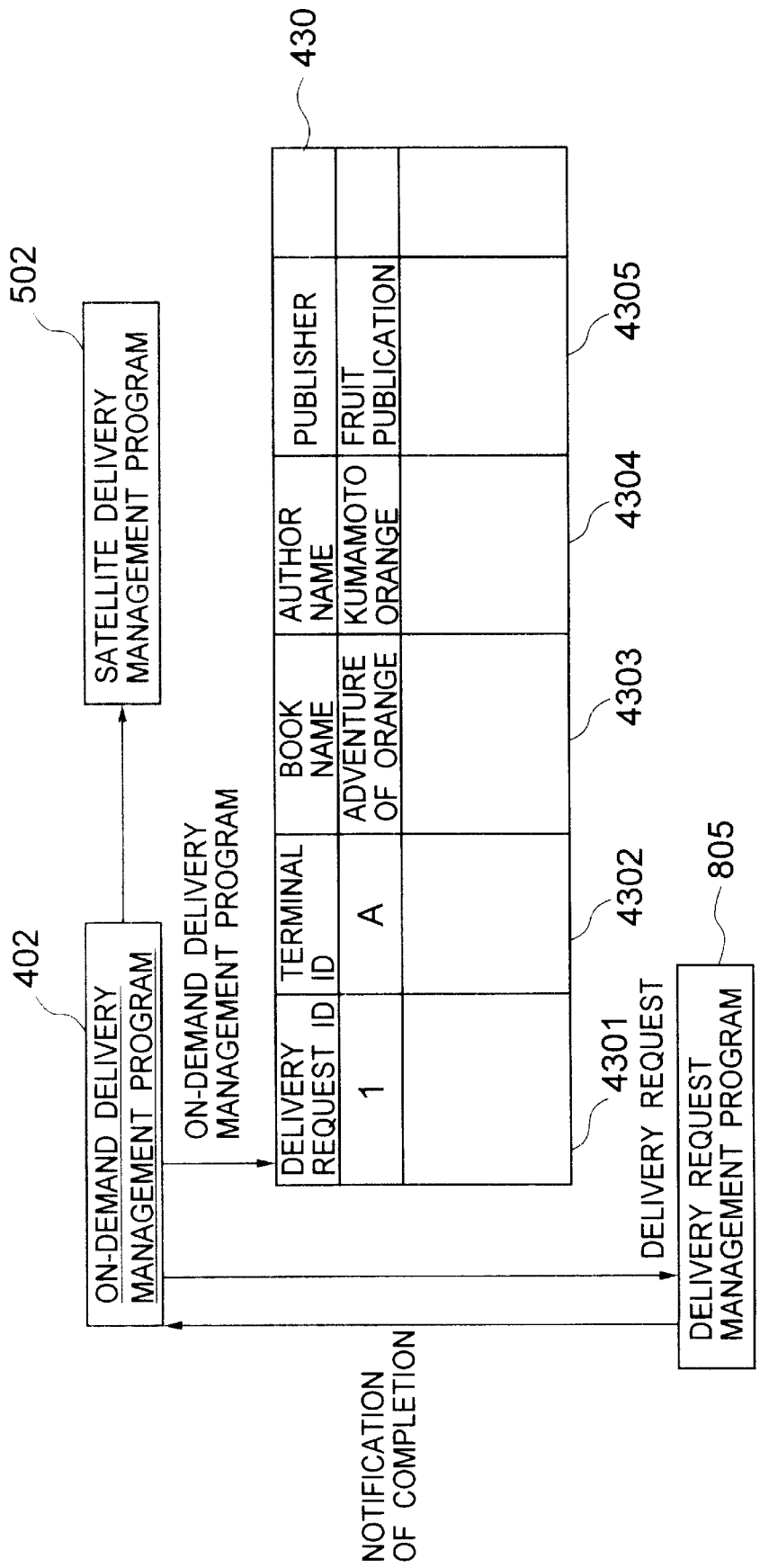
FIG. 13 shows an example of an on-demand delivery request management table and an on-demand delivery management program in the embodiment.
Figure 14:
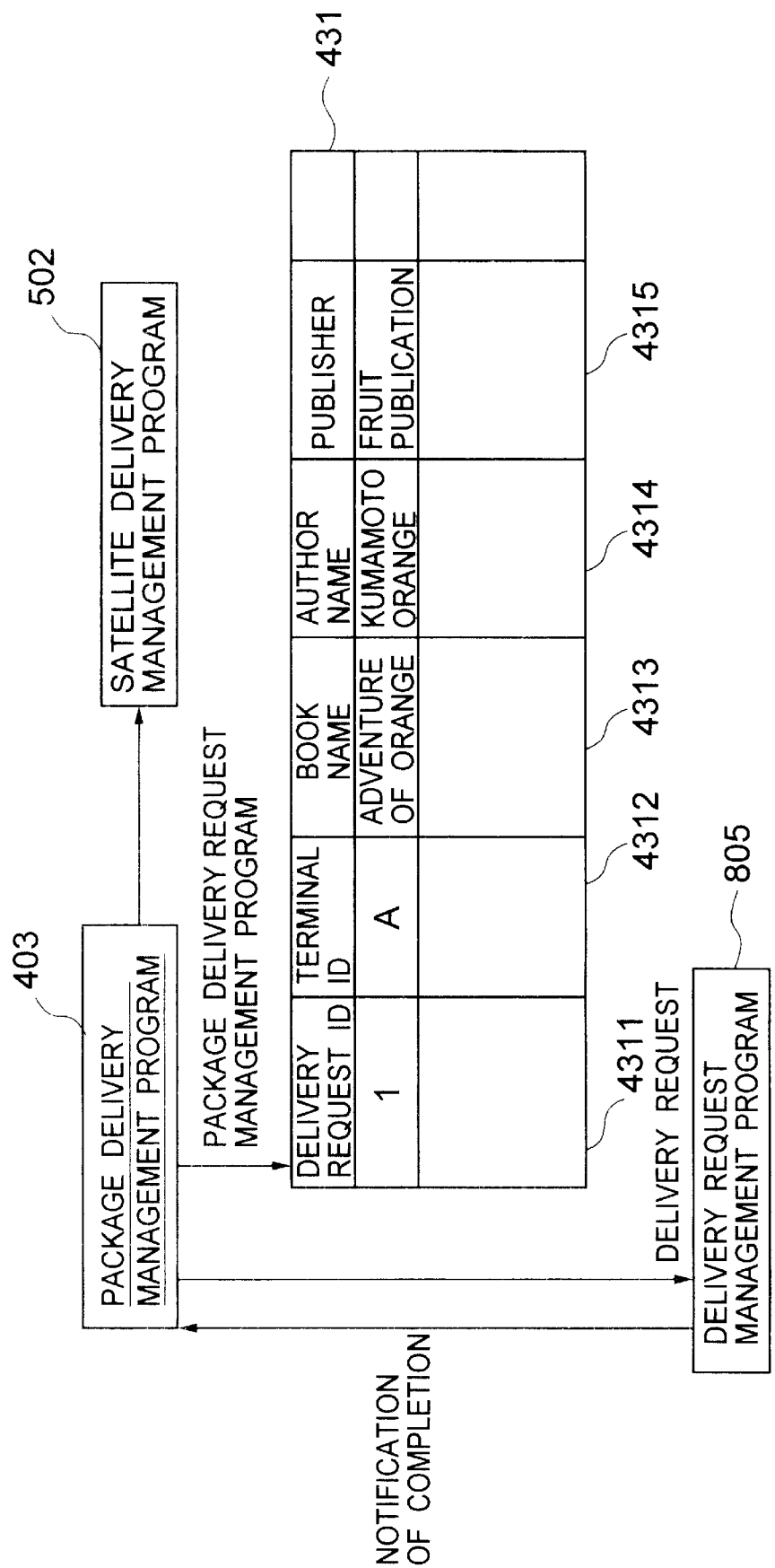
FIG. 14 shows an example of a package delivery request management table and a package delivery management program in the embodiment.
Figure 15:
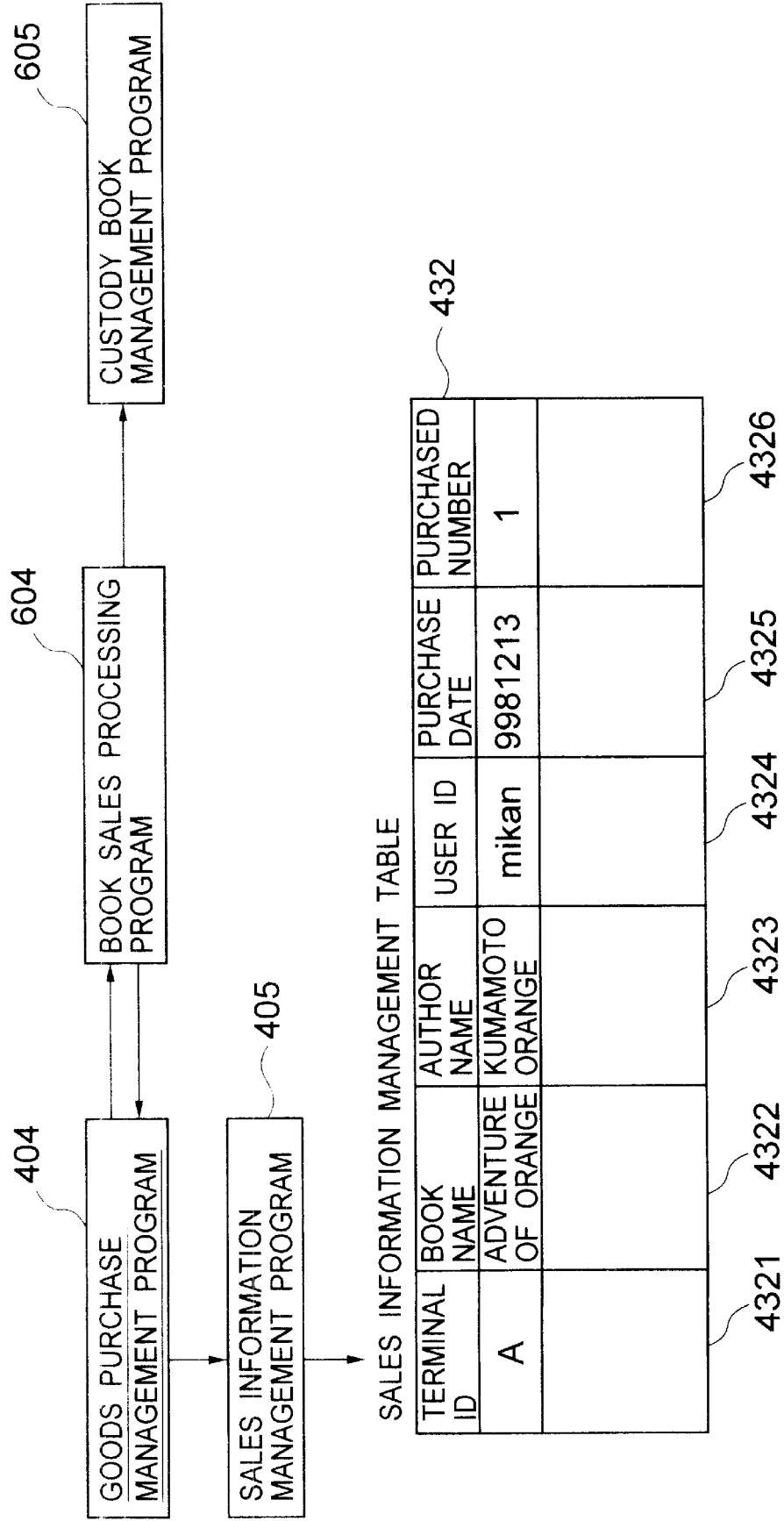
FIG. 15 shows an example of a goods purchase management program and a sales information management table in the embodiment.
Figure 37:
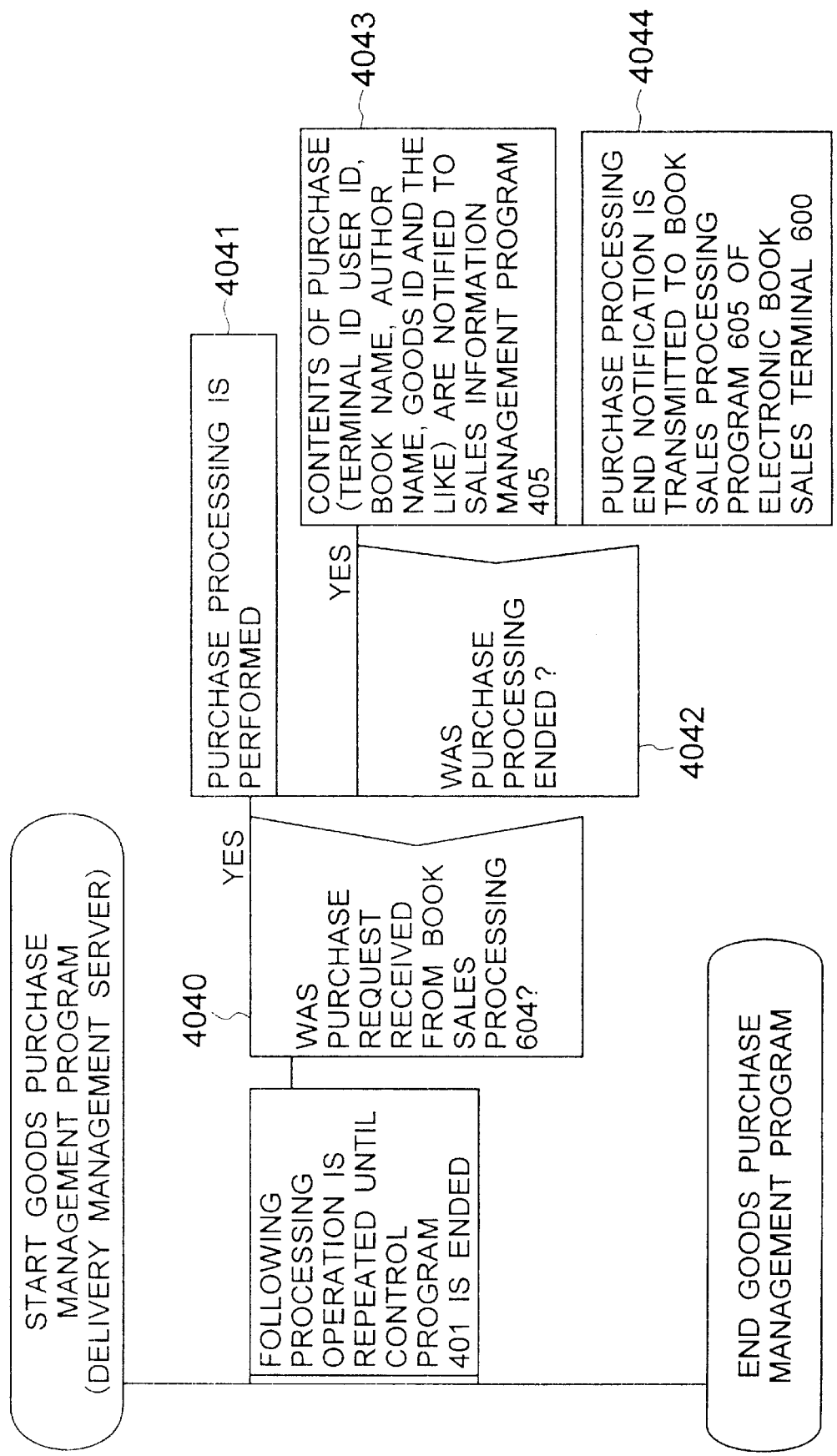
FIG. 37 is a PAD diagram showing a structure and contents of a package delivery management program in the storage and management server in the embodiment.

FIG. 13 shows an embodiment of the on-demand delivery request management table 430. FIG. 14 shows an embodiment of the package delivery request management table 431. FIGS. 15 and 37 show an embodiment of the sales information management table 432 and a PAD diagram of the goods purchase management program 404.

Figure 16:
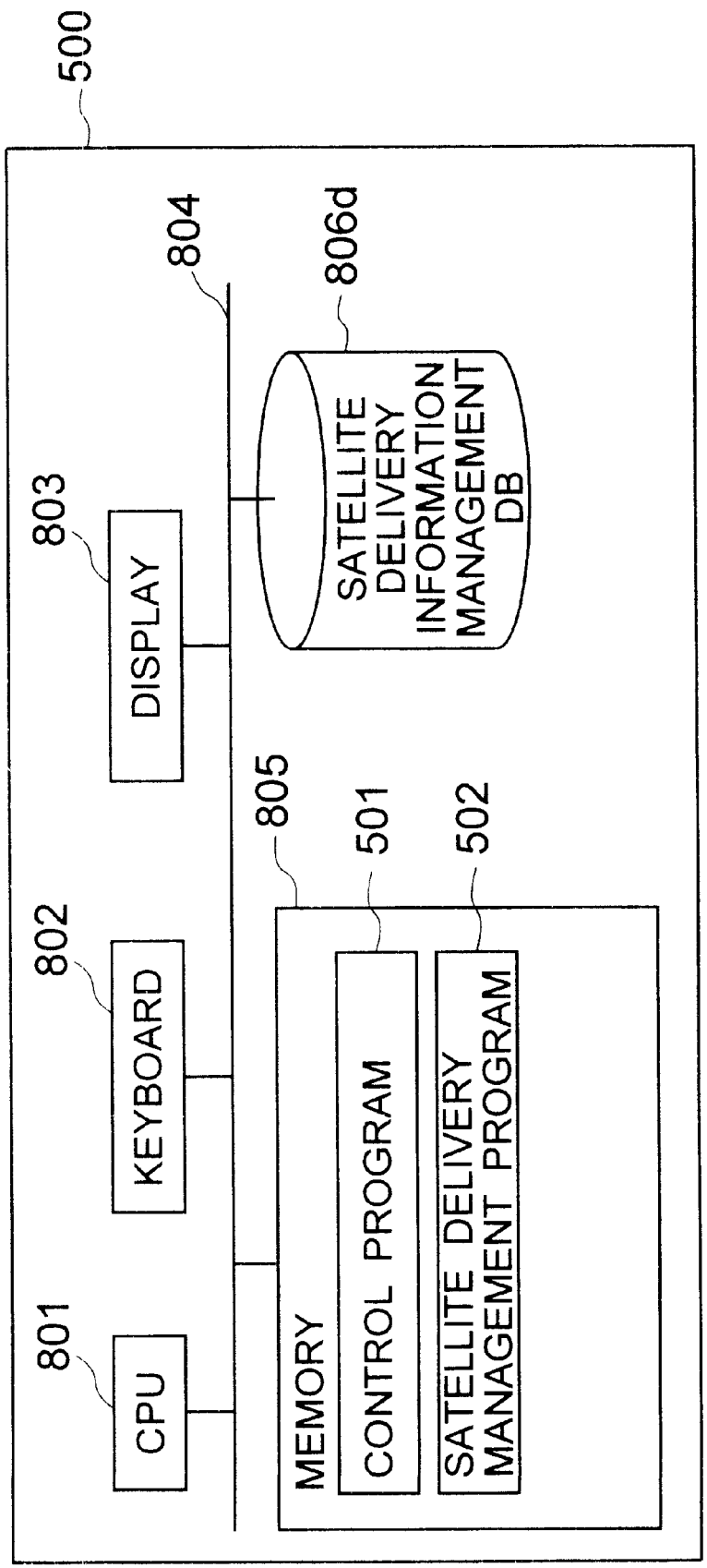
FIG. 16 is a block diagram schematically illustrating a satellite delivery server in the embodiment.

FIG. 16 is a block diagram schematically illustrating the satellite delivery serer 500. The satellite delivery server 500 comprises, as shown in FIG. 16, a central processing unit (CPU) 801, a keyboard 802, a display 803, a bus 804, a memory 805 and a satellite delivery information management database 806d which are connected to one another through the bus 804.

In order to perform the satellite delivery in the electronic book distribution sales system of the embodiment, the satellite delivery server 500 includes a control program 501 and a satellite delivery management program 502 which are stored in the memory 805.

The control program 501 activates the satellite delivery management program 502 upon starting.

The satellite delivery management program 502 which receives the electronic book delivery request and the delivery data from the delivery management server 400 delivers the delivery data to the electronic book sales terminal.

Figure 17:
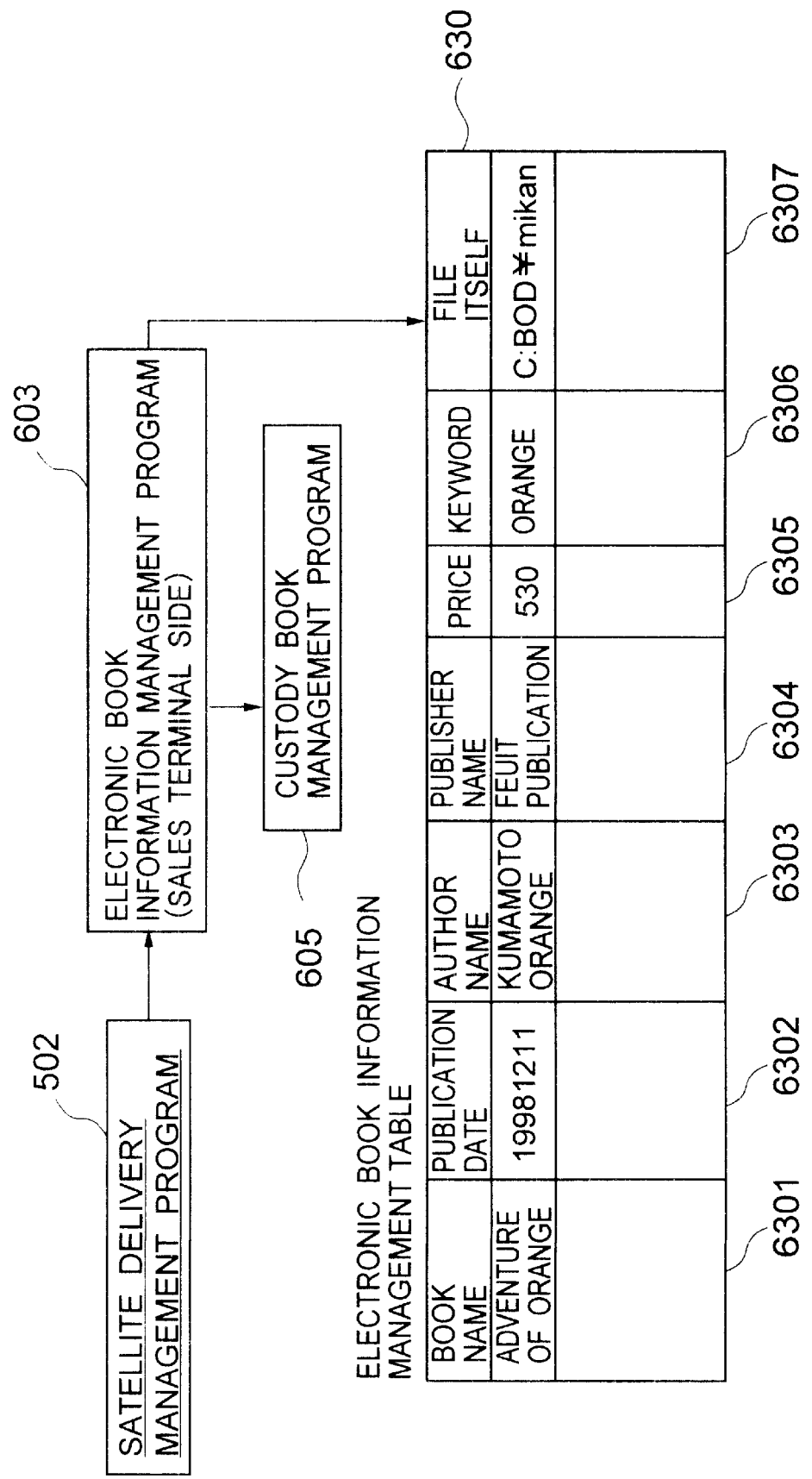
FIG. 17 shows an example of the relation of the electronic book information management program and a satellite delivery program, and the electronic book information management table in the embodiment.
Figure 40:
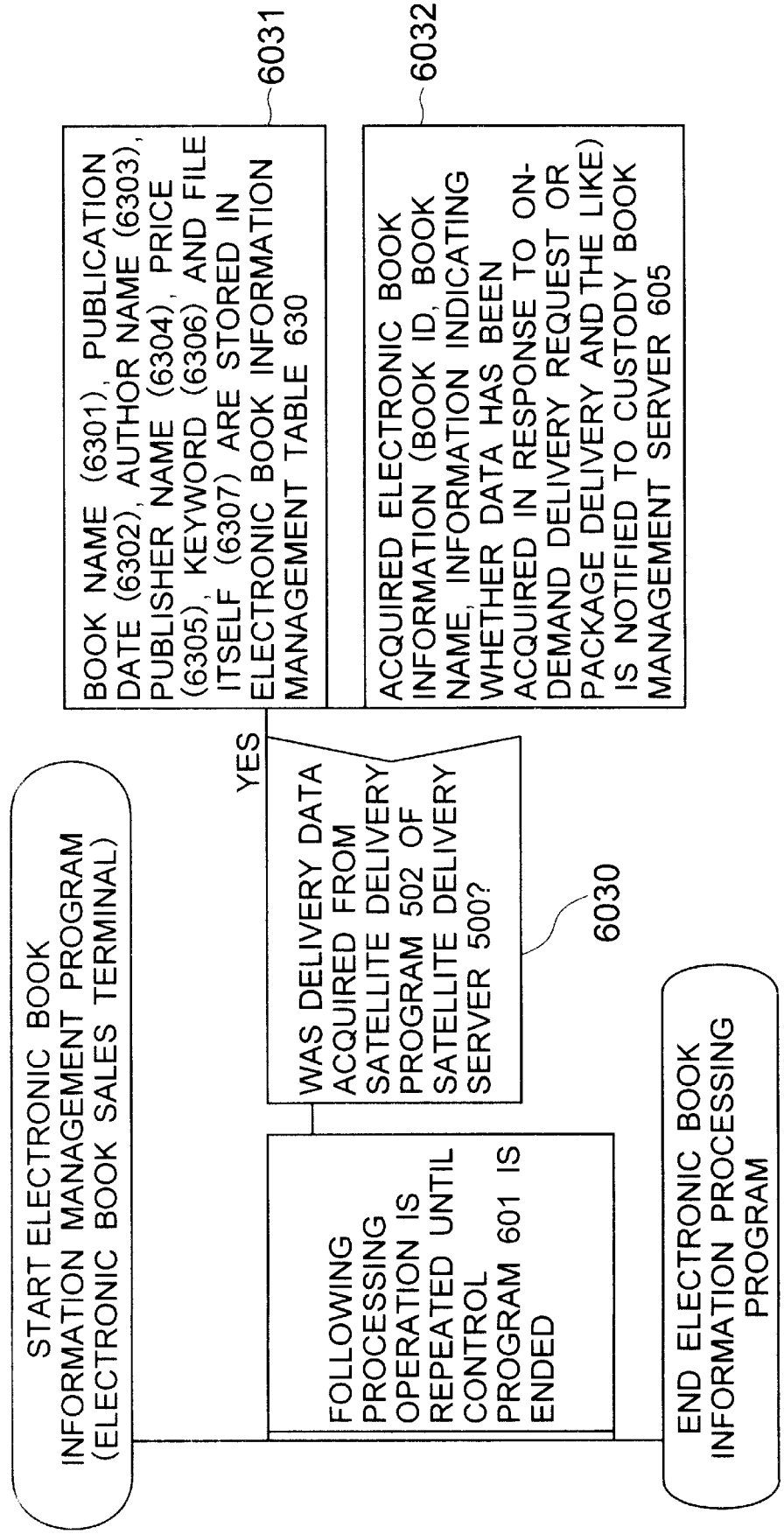
FIG. 40 is a PAD diagram showing a structure and contents of an electronic book information management program in the electronic book sales terminal in the embodiment.

FIGS. 17 and 40 show an embodiment of the electronic book information management table 630 and a PAD diagram of the electronic book information management program 603.

The electronic book sales terminal 600 produces the on-demand delivery request in accordance with the user's purchase request, and performs the disk management in accordance with the sales tendency in each terminal. Further, the electronic book sales terminal 600 produces the package delivery request, and transmits it to the delivery management server 400.

Figure 18:
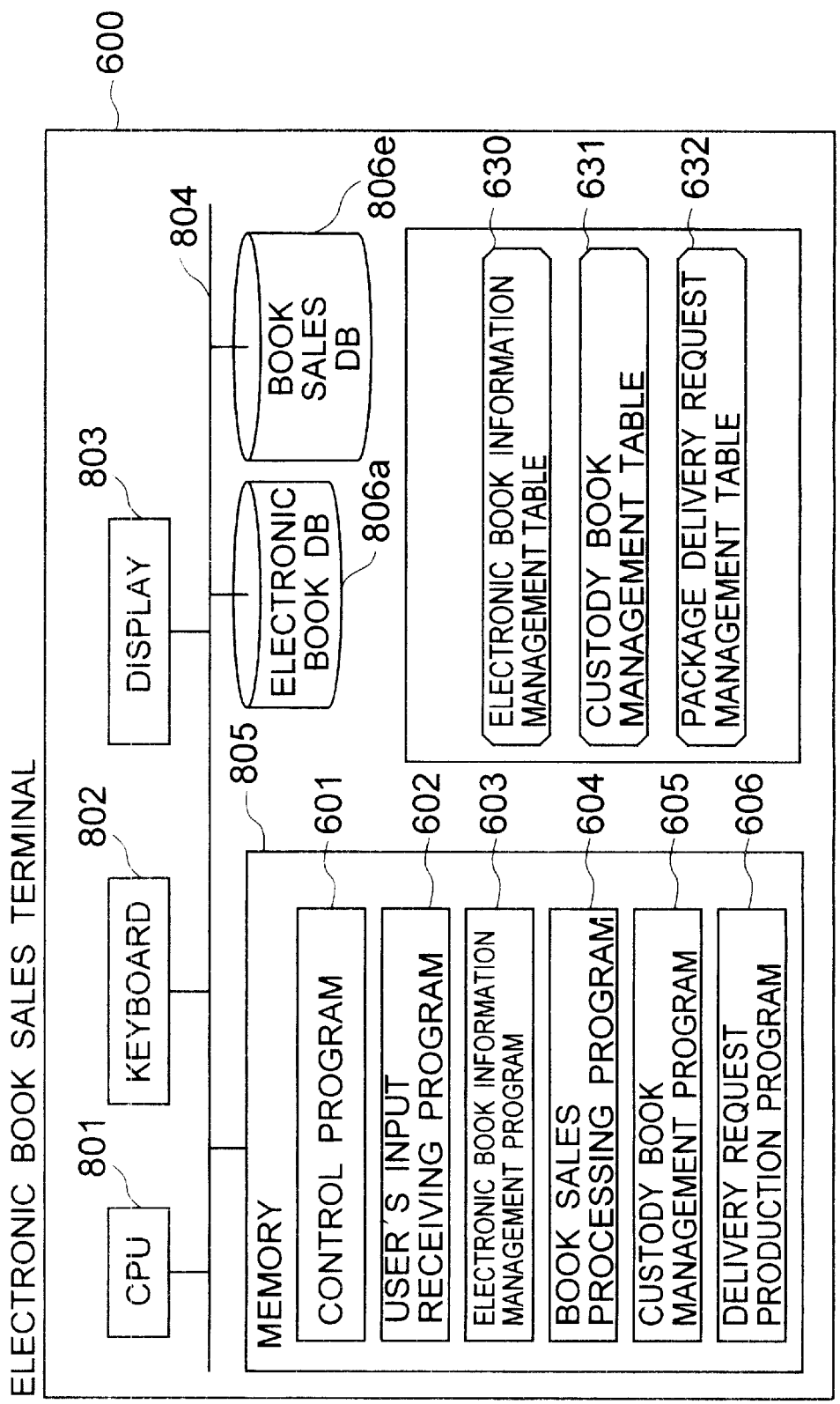
FIG. 18 is a block diagram schematically illustrating an electronic book sales terminal in the embodiment.

FIG. 18 is a block diagram schematically illustrating the electronic book sales terminal 600. The electronic book sales terminal 600 comprises, as shown in FIG. 18, a central processing unit (CPU) 801, a keyboard 802, a display 803, a bus 804, a memory 805, an electronic book database 806a and a book sales database 806e which are connected to one another through the bus 804.

In order to sell the electronic book in the electronic book distribution and sales system of the embodiment, the electronic book sales terminal 600 includes a control program 601, a user's input receiving program 602, an electronic book information management program 603, a book sales processing program 604, a custody book management program 605, a delivery request production program 606, an electronic book information management table 630, a custody book management table 631 and a package delivery request management table 632 which are stored in the memory 805.

The control program 601 activates the user's input receiving program 602, the electronic book information management program 603, the book sales processing program 604, the custody book management program 605 and the delivery request production program 606 upon starting.

The user's input receiving program 602 displays an inputting and setting picture 633 for the package delivery request, and transmits the input information to the delivery management server 400 after user's inputting operation.

After the electronic book information management program 603 acquires the delivery data from the satellite delivery server (satellite delivery center) 500, the electronic book information management program 603 stores the acquired information in the electronic book information management table 630, and notifies the acquired electronic book information to the custody book management program 605.

The book sales processing program 604 of the electronic book sales terminal 600 transmits the purchase request to the goods purchase management program 404 of the delivery management server 400 when the user determines to purchase the electronic book. The book sales processing program 604 notifies the purchased electronic book information to the custody book management program 605 when the purchase processing performed together with the delivery management server 400 is ended.

When the electronic book information is received from the book sales processing program 604, the custody book management program 605 of the electronic book sales terminal 600 adds "1" to the total sales number and the sales number for a pertinent week of the pertinent book in the custody book management table 631. When the electronic book information is received from the electronic book information management program 603 and the electronic book information is notified in response to the on-demand delivery request, the custody book management program 605 adds "1" to the total sales number and the sales number for a pertinent week of the pertinent book in the custody book management table 631.

When the production time of the package delivery request is reached, the delivery request production program 606 of the electronic book sales terminal 600 reads out the information relative to the week of the month at the present time from the custody book management table 631, and selects the electronic book having the total sales number which is in the higher rank and the electronic book having the total sales number not in the higher rank but increasing at a week near the week. The delivery request production program 606 deletes the records for other electronic books. Further, the records for the delivery request are read out from the package delivery request management table 632, and are notified to the delivery management server 400. In addition, when the production time of the package delivery request is not reached and the on-demand request from the user is received, the on-demand request from the user is notified to the on-demand delivery management program 402 of the delivery management server 400.

Figure 19:
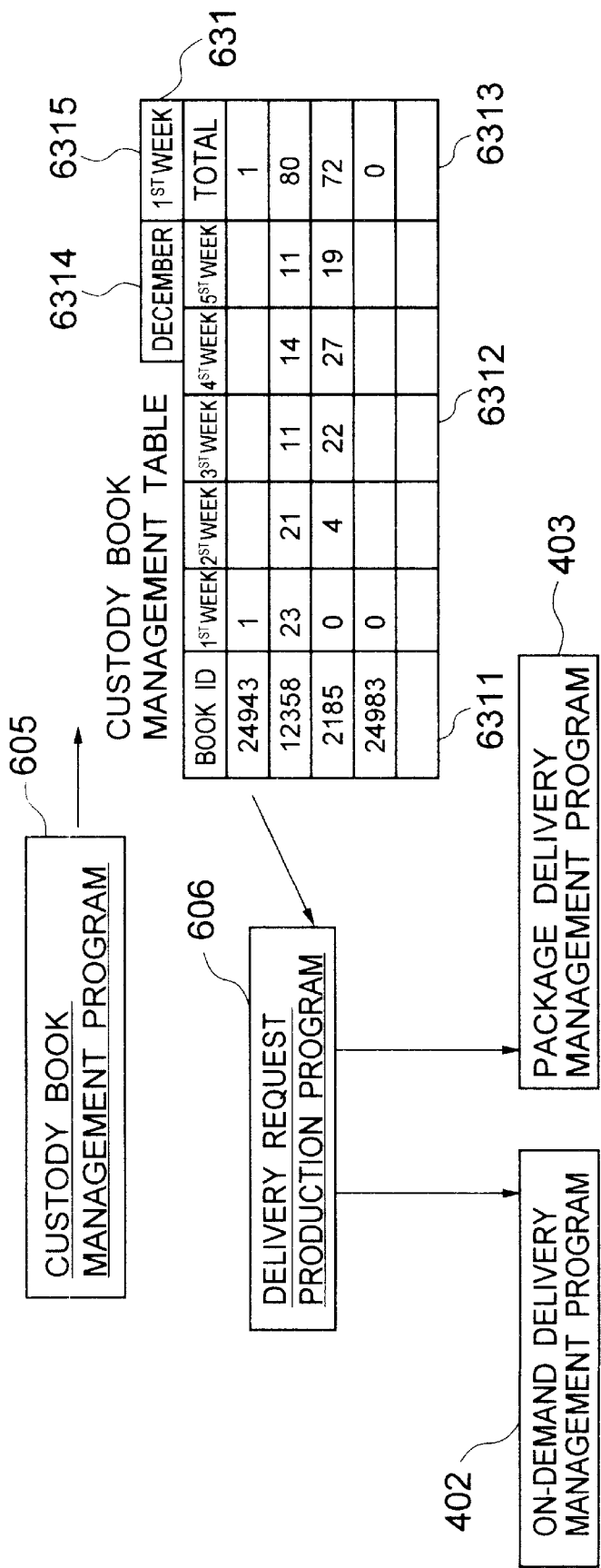
FIG. 19 shows an example of the relation of a custody book management program and a delivery request production program and a custody book management table in the embodiment.
Figure 20:
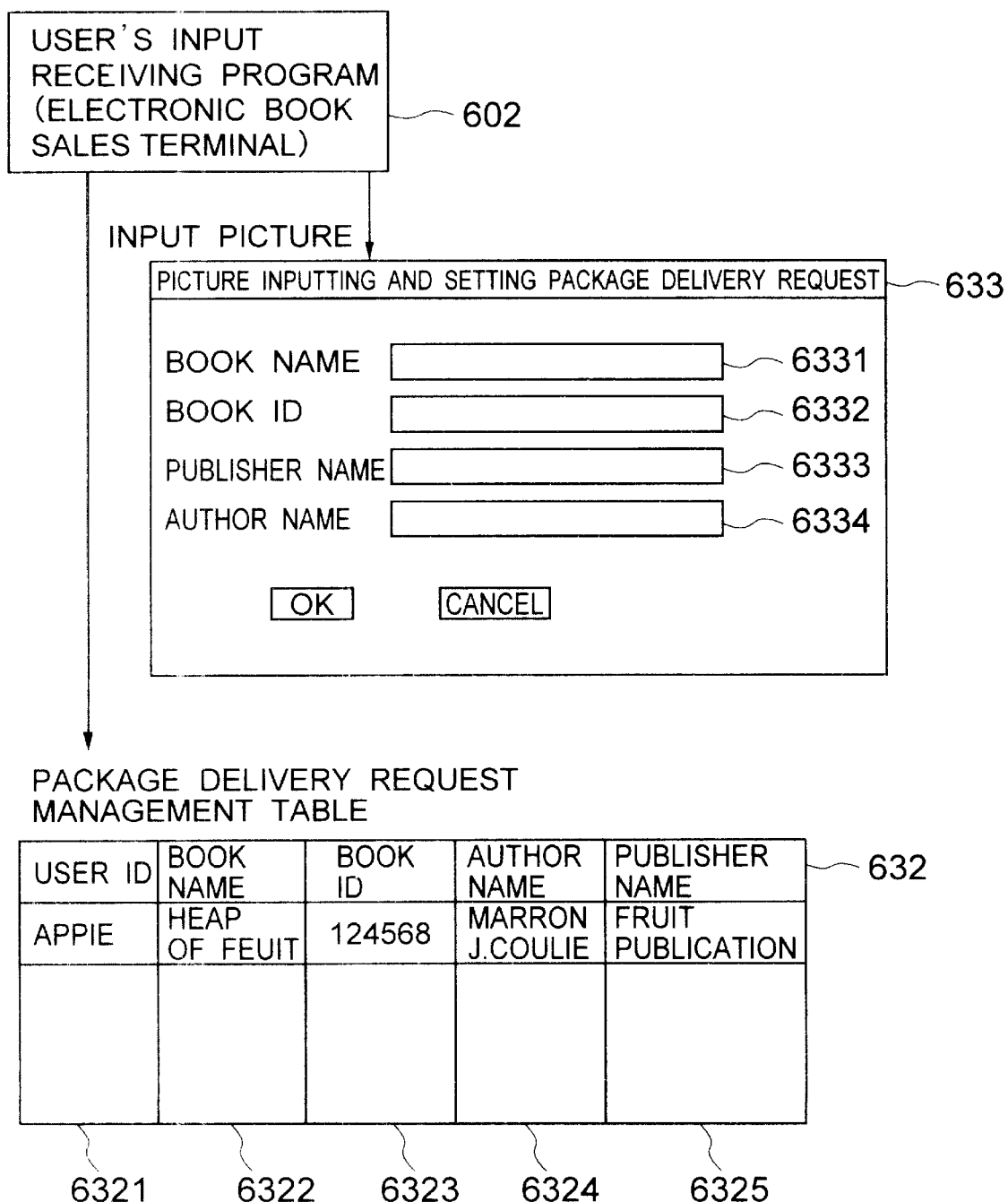
FIG. 20 shows an example of a user's input receiving program, a package delivery request management table, and an input picture in the embodiment.
Figure 41:
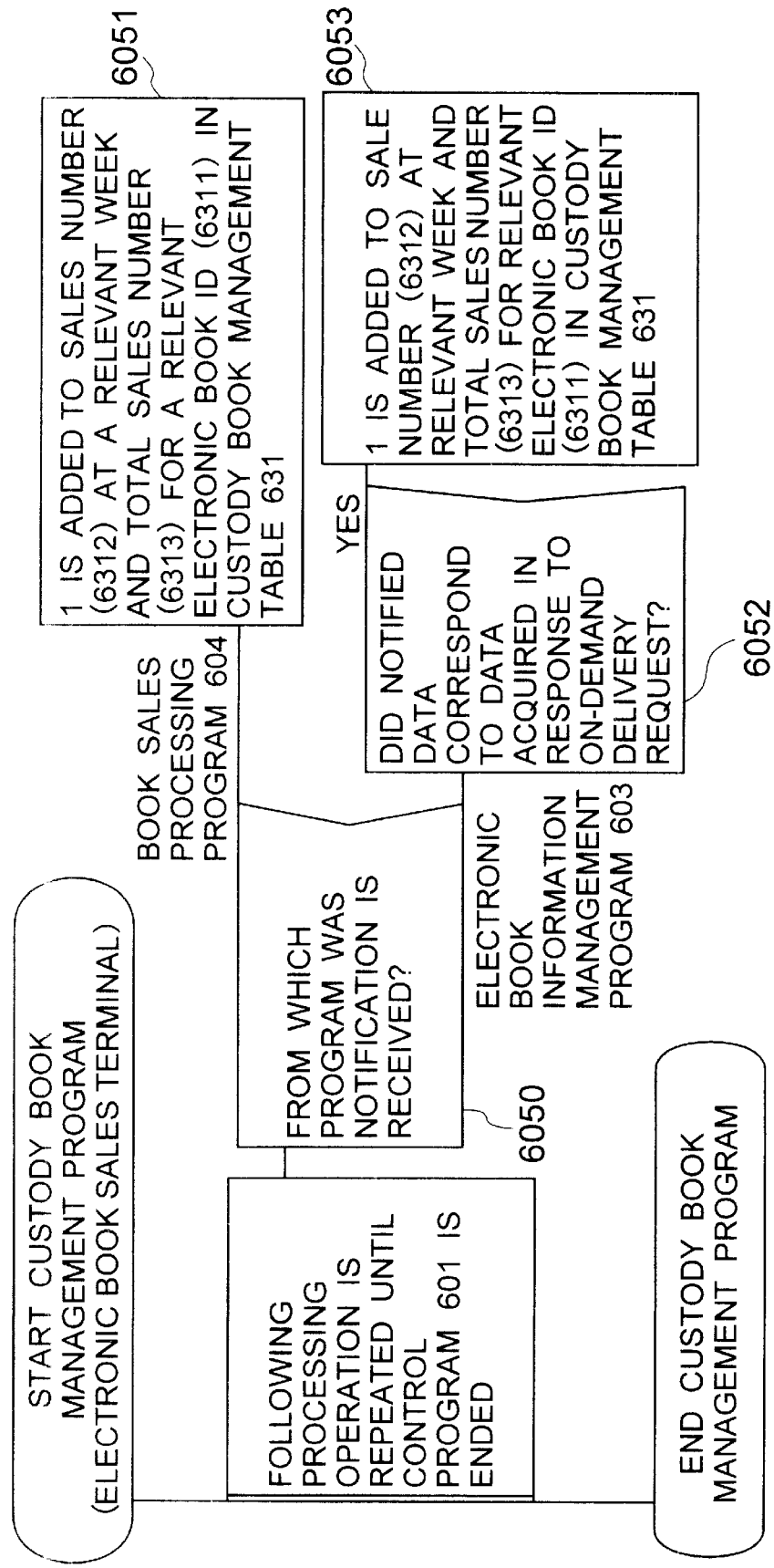
FIG. 41 is a PAD diagram showing a structure and contents of a custody book management program in the electronic book sales terminal in the embodiment.

FIG. 17 shows an embodiment of the electronic book information management table 630. FIGS. 19, 41 and 43 show an embodiment of the custody book management table 631 and PAD diagrams of the custody book management program 605 and the delivery request production program 606. FIGS. 20 and 44 show embodiments of the package delivery request management table 632 and the input picture 633, and a PAD diagram of the user's input receiving program 602.

Figure 21:
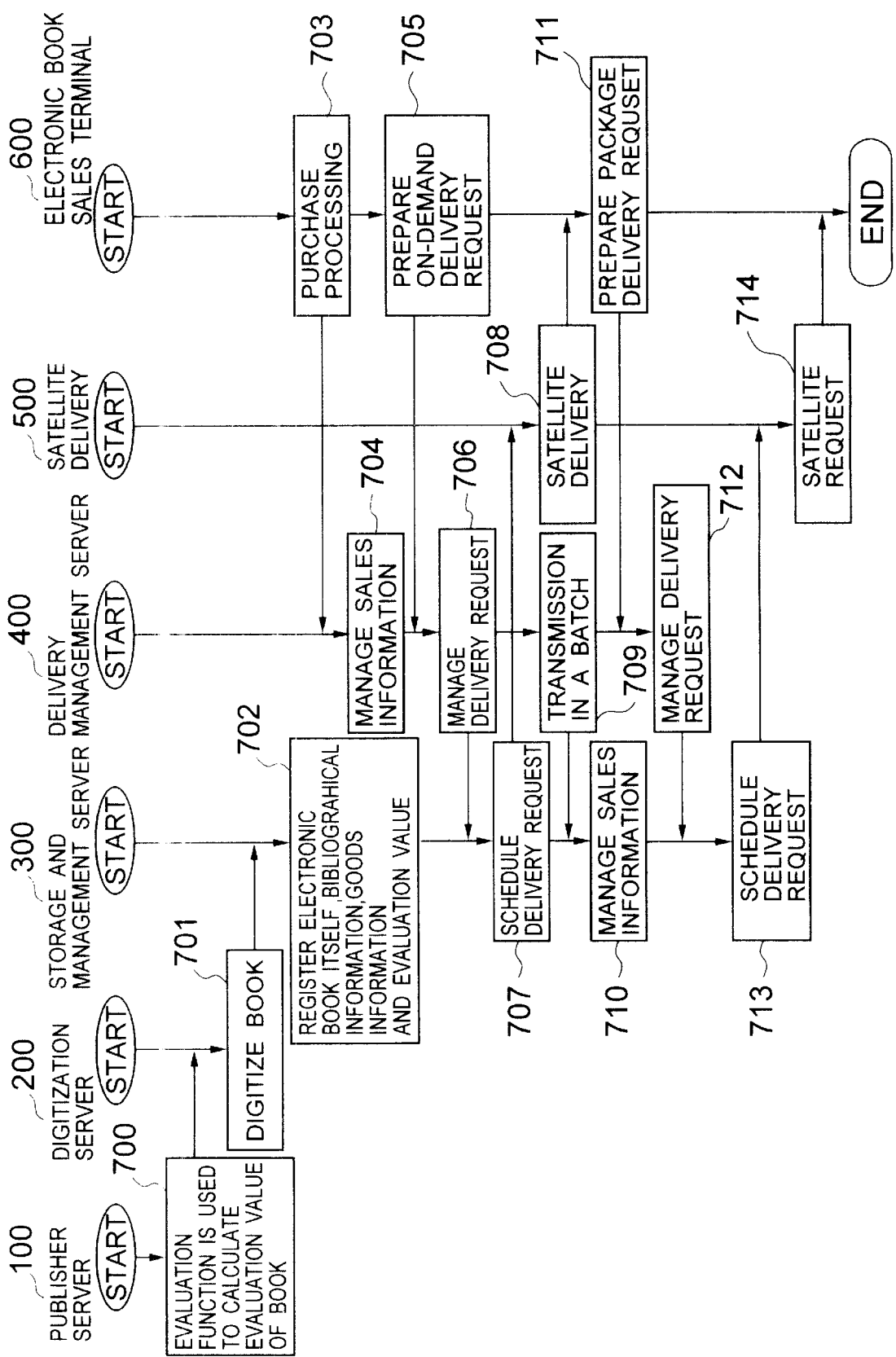
FIG. 21 is a diagram for explaining operation of the electronic book distribution and sales system in the embodiment.

Referring now to FIGS. 1 and 21, the operation of the electronic book distribution and sales system of the embodiment is described.

FIG. 21 is a diagram for explaining the operation of the electronic book distribution and sales system of the embodiment.

The particular evaluation function is used to calculate the evaluation value of the electronic book to be produced by the publisher server 100 (700) which transmits the book and the evaluation value to the digitization server 200. The digitization server 200 receives the information from the publisher server 100, and digitizes the book (701). The digitization server 200 defines the bibliographical information and the goods information, and registers the bibliographical information and the goods information in the storage and management server 300. The storage and management server 300 which acquires the various information performs the storage and management (702).

On the other hand, the electronic book sales terminal 600 performs the purchase processing (703) of the book selected by the user between the delivery management server 400 and the electronic book sales terminal. The delivery management server 400 manages the sales information concerning the purchase processing (704). The electronic book sales terminal 600 produces the on-demand delivery request at the stage of acquisition of the book after the actual purchase processing (705), and transmits the on-demand delivery request to the delivery management server 400. When the delivery management server 400 acquires the on-demand delivery request, the delivery management server 400 manages the delivery request (706), and transmits the delivery request to the storage and management server 300.

The storage and management server 300 which receives the delivery request manages the delivery request (batch processing), and acquires the data of the relevant electronic book. After the storage and management server 300 manages (schedules) the delivery request (707), the storage and management server 300 transmits the electronic book data to the satellite delivery server 500.

The satellite delivery server 500 which acquires the electronic book data performs the satellite delivery of the electronic book data to the relevant electronic book sales terminal 600 (708). On the other hand, the sales information is transmitted in a batch from the delivery management server 400 to the storage and management server 300. The storage and management server manages the sales information (710).

When the package delivery request time is reached, the electronic book sales terminal 600 produces the package delivery request (711). In this case, the disk management and the production of the delivery request are performed in accordance with the sales tendency of each electronic book sales terminal 600. Thereafter, the delivery request is transmitted to the delivery management server 400.

The delivery management server 400 which acquires the package delivery request from each electronic book sales terminal 600 manages the delivery request (712), and then transmits the delivery request to the storage and management server 300. The storage and management server 300 which acquires the delivery request manages (schedules) the delivery request and after acquisition of the relevant electronic book data, the storage and management server 300 transmits the electronic book data to the satellite delivery server 500. The satellite delivery server 500 which acquires the electronic book data performs the satellite delivery of the electronic book data to the relevant electronic book sales terminal 600.

The programs and contents thereof are now described.

Figure 22:
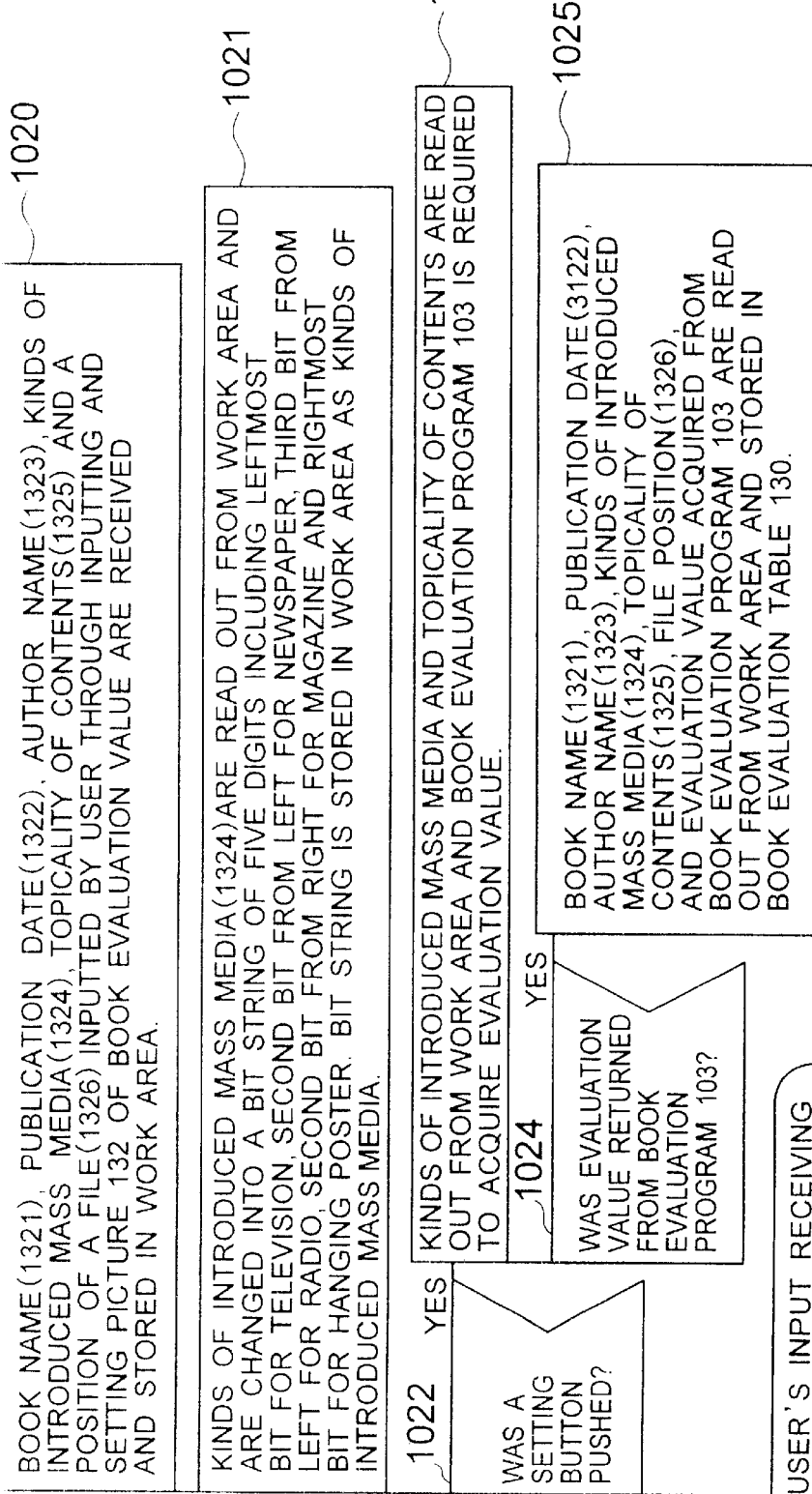
FIG. 22 is a PAD diagram showing a structure and contents of the user's input receiving program in the publisher server in the embodiment.

FIG. 22 is a flow chart showing the processing procedure and the contents of the user's input receiving program 102 of the publisher server 100 of the embodiment.

The processing of the user's input receiving program 102 includes the following steps.

Step 1020: A book name (1321), a publication date (1322), an author name (1323), kinds of introduced mass media (1324), topicality of contents (1325) and a position of a file (1326) inputted by the user using the inputting and setting picture 132 of the evaluation value of book are received and stored in work area.

Step 1021: The kinds of introduced mass media (1324) are read out from the work area, and are changed into a bit string of five digits including the leftmost bit for television, the second bit from the left for a newspaper, the third bit from the left for radio, the second bit from the right for magazine, and the rightmost bit for hanging poster. The bit string is stored in the work area as the kinds of introduced mass media.

Step 1022: Did a setting button pushed?

Step 1023: The kinds of introduced mass media and the topicality of contents are read out from the work area, and the book evaluation program 103 is required to acquire the evaluation value.

Step 1024: Was the evaluation value returned from the book evaluation program 103?

Step 1025: The book name (1321), the publication date (3122), the author name (1323), the kinds of introduced mass media (1324), the topicality of contents (1325), the position of the file (1326) and the evaluation value acquired from the book evaluation program 103 are read out from the work area, and stored in the book evaluation table 130 to thereby end the user's input receiving program 102.

FIG. 23 is a flow chart showing the processing procedure and the contents of the book evaluation program 103 of the publisher server 100 of the embodiment.

The processing of the book evaluation program 103 includes the following steps.

Step 1030: Was the book evaluation program 103 called from the user's input receiving program 102?

Step 1031: The weights of television (1311), newspaper (1312), radio (1313), magazine (1314) and hanging poster (1315) and the weights (1316) of the topicality of contents and the introduced mass media are read out from the evaluation reference table 131, and stored in the work area.

Step 1032: The weights of television (1311), newspaper (1312), radio (1313), magazine (1314) and hanging poster (1315) are read out from the work area, and the bit string of five bits received from the user's input receiving program 102 is also read out. The following equation is calculated, and the calculated result is stored in the work area as the weight of the whole mass media.

(the leftmost bit of the 5-bit string)×(the weight 1311 of television)+(the second bit from the left of the 5-bit string)×(the weight 1312 of newspaper)+(the third bit from the left of the 5-bit string)×(the weight 1313 of radio)+(the second bit from the right of the 5-bit string)×(the weight 1314 of magazine)+(the rightmost bit of the 5-bit string)×(the weight 1315 of hanging poster).

Step 1033: The weight (1316) of the topicality of contents and the introduced mass media and the weight of the whole mass media calculated in the above step are read out from the work area, and the topicality (1325) of contents received from the user's input receiving program 102 is also read out from the work area. The following equation is calculated, and the calculated result is stored in the work area as the evaluation value (1306) of the book.

(the weight of the whole mass media)+(the weight 1316 of the topicality of contents and the introduced mass media)×(the topicality of contents).

Step 1034: The evaluation value (1306) of the book is read out from the work area, and is notified to the user's input receiving program 102 to thereby end the book evaluation program 103.

Figure 24:
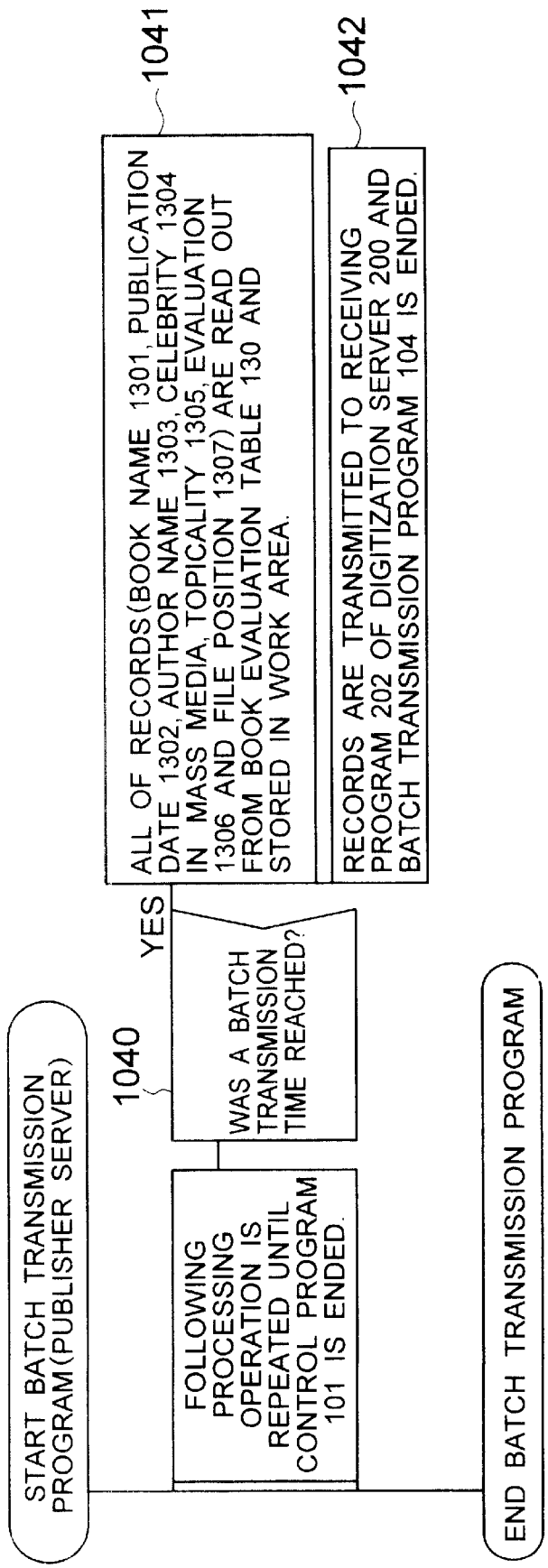
FIG. 24 is a PAD diagram showing a structure and contents of a batch transmission program in the publisher server in the embodiment.

FIG. 24 is a flow chart showing the processing procedure and the contents of the batch transmission program 104 of the publisher server 100 of the embodiment.

The processing of the batch transmission program 104 includes the following steps.

The following processing operation is repeated until the control program 101 is ended.

Step 1040: Was the batch transmission time reached?

Step 1041: All of records (book name 1301, publication date 1302, author name 1303, celebrity 1304 in mass media, topicality 1305, evaluation 1306 and file position 1307) are read out from the book evaluation table 130, and stored in the work area.

Step 1042: The records are transmitted to the receiving program 202 of the digitization server 200, and the batch transmission program 104 is ended.

Figure 25:
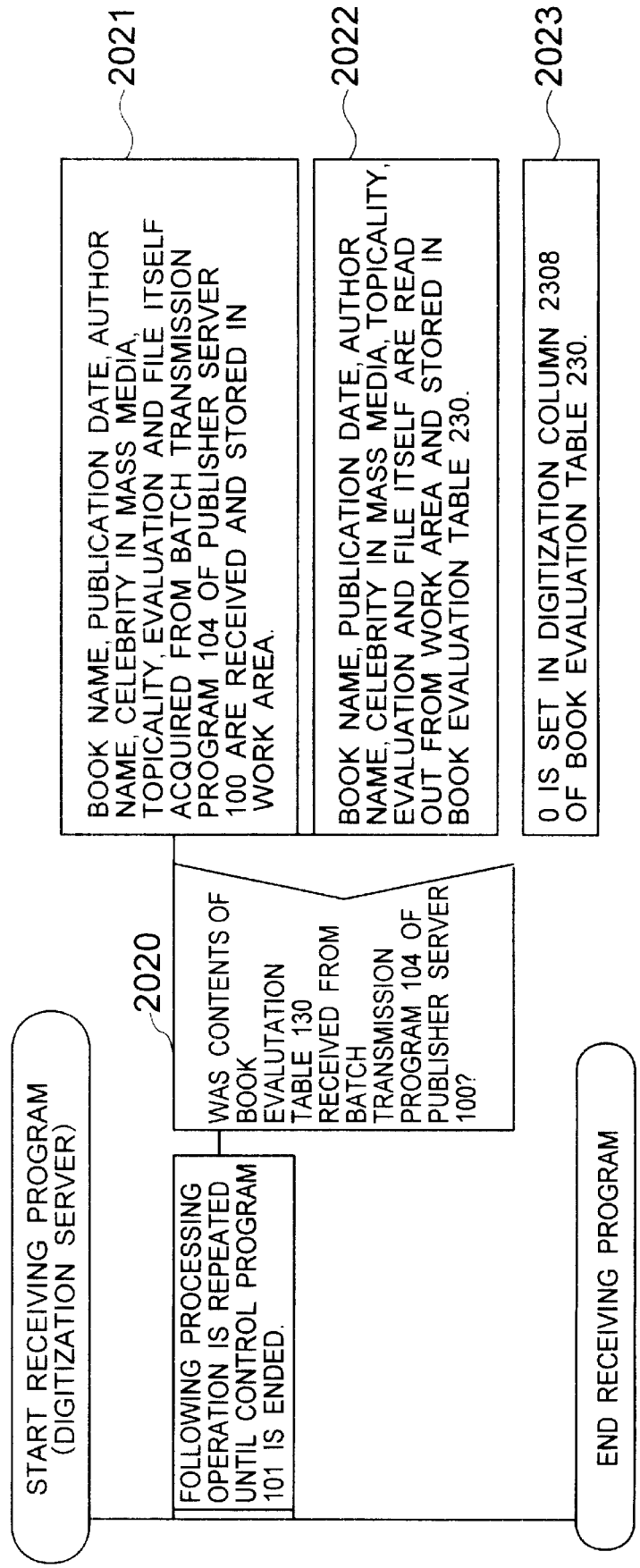
FIG. 25 is a PAD diagram showing a structure and contents of a receiving program in the digitization server in the embodiment.

FIG. 25 is a flow chart showing the processing procedure and the contents of the receiving program 202 of the digitization server 200 of the embodiment.

The processing procedure and the contents of the receiving program 202 include the following steps.

The following processing operation is repeated until the control program 201 is ended.

Step 2020: Was the contents of the book evaluation table 130 received from the batch transmission program 104 of the publisher server 100?

Step 2021: The book name, the publication data, the author name, the celebrity in mass media, the topicality, the evaluation and the file itself acquired from the batch transmission program 104 of the publisher server 100 are received, and stored in the work area.

Step 2022: The book name, the publication data, the author name, the celebrity in mass media, the topicality, the evaluation and the file itself are read out from the work area, and stored in the book evaluation table 230.

Step 2023: "0" is set in the digitization column 2308 of the book evaluation table 230, and the processing of the receiving program 202 is ended.

Figure 26:
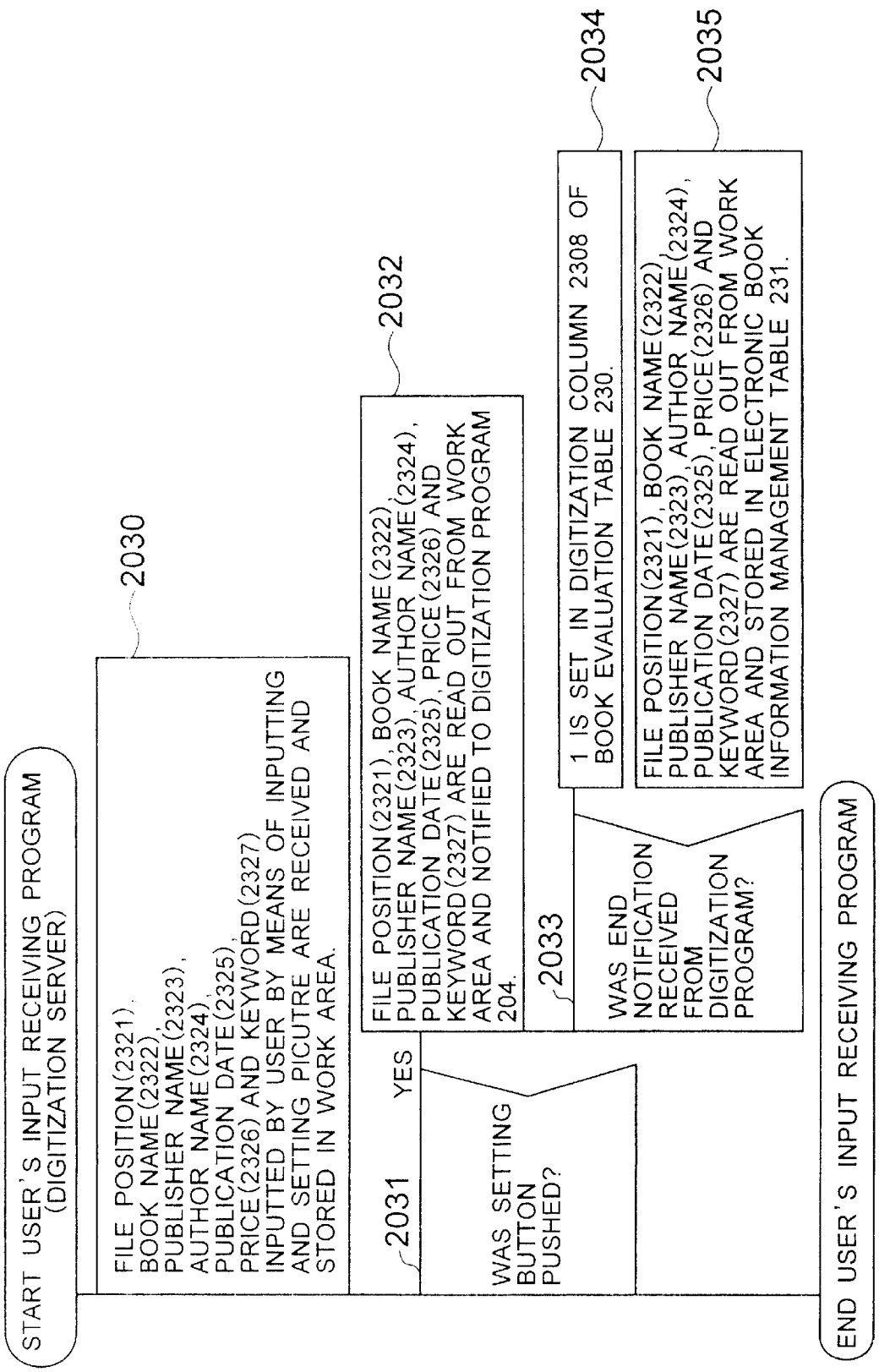
FIG. 26 is a PAD diagram showing a structure and contents of a user's input receiving program in the digitization server in the embodiment.

FIG. 26 is a flow chart showing the processing procedure and the contents of the user's input receiving program 203 of the digitization server 200 of the embodiment.

The processing of the user's input receiving program 203 includes the following steps.

Step 2030: The file position (2321), the book name (2322), the publisher name (2323), the author name (2324), the publication date (2325), the price (2326) and a keyword (2327) inputted by the user by means of the inputting and setting picture for electronic book information are received, and stored in the work area.

Step 2031: Was the setting button pushed?

Step 2032: The file position (2321), the book name (2322), the publisher name (2323), the author name (2324), the publication date (2325), the price (2326) and a keyword (2327) are read out from the work area, and notified to the digitization program 204.

Step 2033: Was the end notification received from the digitization program 204?

Step 2034: "1" is set in the digitization column 2308 of the book evaluation table 230.

Step 2035: The file position (2321), the book name (2322), the publisher name (2323), the author name (2324), the publication date (2325), the price (2326) and a keyword (2327) are read out from the work area, and stored in the electronic book information management table 231. The processing of the user's input receiving program 203 is ended.

Figure 27:
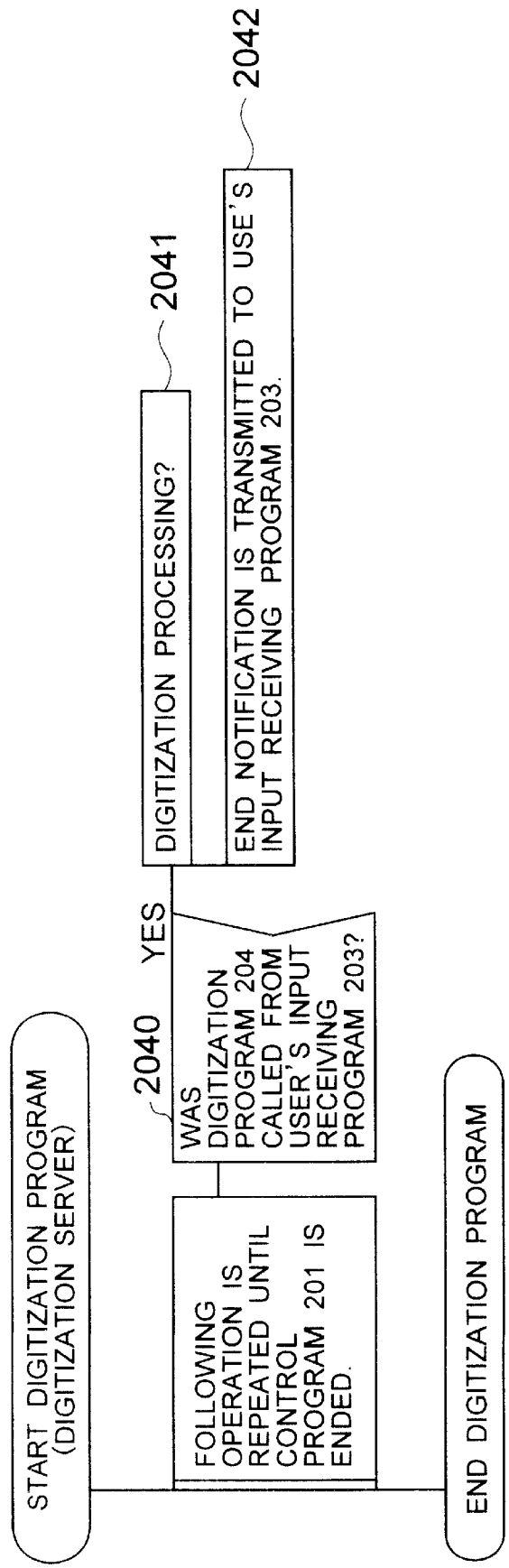
FIG. 27 is a PAD diagram showing a structure and contents of a digitization program in the digitization server in the embodiment.

FIG. 27 is a flow chart showing the processing procedure and the contents of the digitization program 204 of the digitization serer 200 of the embodiment.

The processing of the digitization program 204 includes the following steps.

The following processing operation is repeated until the control program 201 is ended.

Step 2040: Was the digitization program 204 called from the user's input receiving program 203?

Step 2041: Digitization processing.

Step 2042: The end notification is transmitted to the user's input receiving program 203, and the processing of the digitization program 204 is ended.

Figure 28:
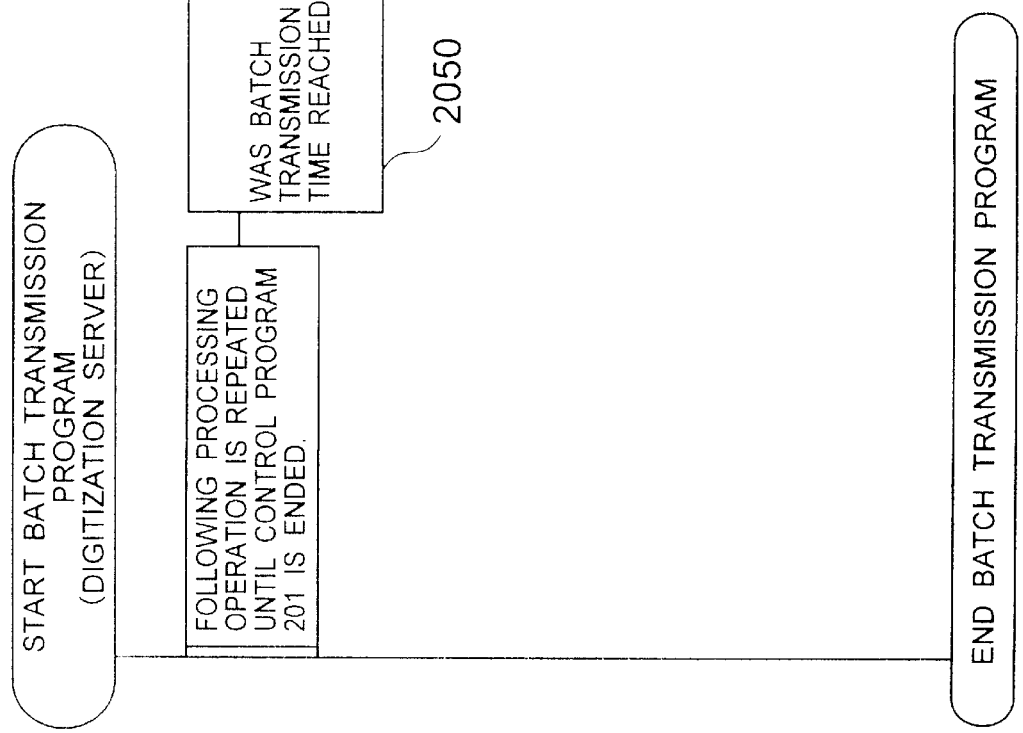
FIG. 28 is a PAD diagram showing a structure and contents of a batch transmission program in the digitization server in the embodiment.

FIG. 28 is a flow chart showing the processing operation and contents of the batch transmission program 205 of the digitization server 200 of the embodiment.

The processing of the batch transmission program 205 includes the following steps.

The following processing operation is repeated until the control program 201 is ended.

Step 2050: Was the batch transmission time reached?

Step 2051: The book name (2311), the publication date (2312), the author name (2313), the publisher name (2314), the price (2315), the keyword (2316) and the file itself (2316) are read out from the electronic book information management table 231, and stored in the work area.

Step 2052: The book name (2311), the publication date (2312), the author name (2313), the publisher name (2314), the price (2315) and the keyword (2316) are read out from the work area, and notified to the electronic book information management program 302 of the storage and management server 300.

Step 2053: The book name (2301), the publication date (2302), the author name (2303), the celebrity (2304) in mass media, the topicality (2305), the evaluation (2306) and the file itself (2307) are read out from the book evaluation table 230, and stored in the work area.

Step 2054: The book name (2301), the publication date (2302), the author name (2303), the celebrity (2304) in mass media, the topicality (2305), the evaluation (2306) and the file itself (2307) are read out from the work area, and notified to the electronic book guidance table management program 303 of the storage and management server 300. The processing of the batch transmission program 205 is ended.

Figure 29:
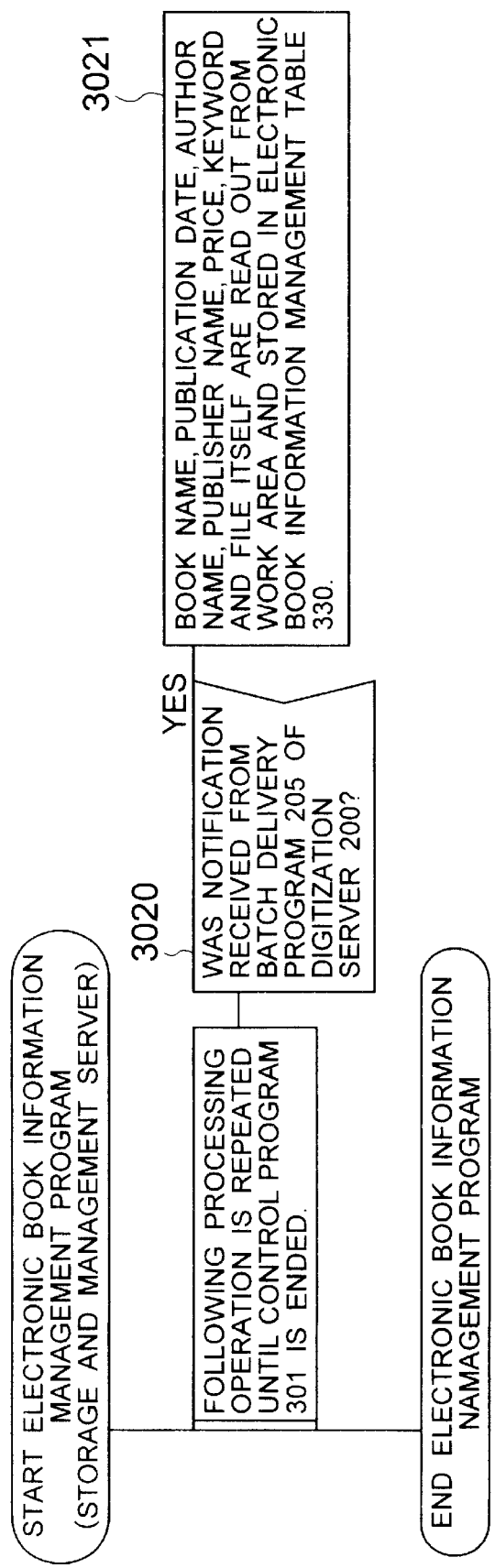
FIG. 29 is a PAD diagram showing a structure and contents of an electronic book information management program in the storage and management server in the embodiment.

FIG. 29 is a flow chart showing the processing procedure and contents of the electronic book information management program 302 of the storage and management server 300 of the embodiment.

The processing of the electronic book information management program 302 includes the following steps.

The following processing operation is repeated until the control program 301 is ended.

Step 3020: Was the notification received from the batch delivery program 205 of the digitization server 200?

Step 3021: The book name, the publication date, the author name, the publisher name, the price, the keyword and the file itself are readout from the work area, and stored in the electronic book information management table 330. The processing of the electronic book information management program 302 is ended.

Figure 30:
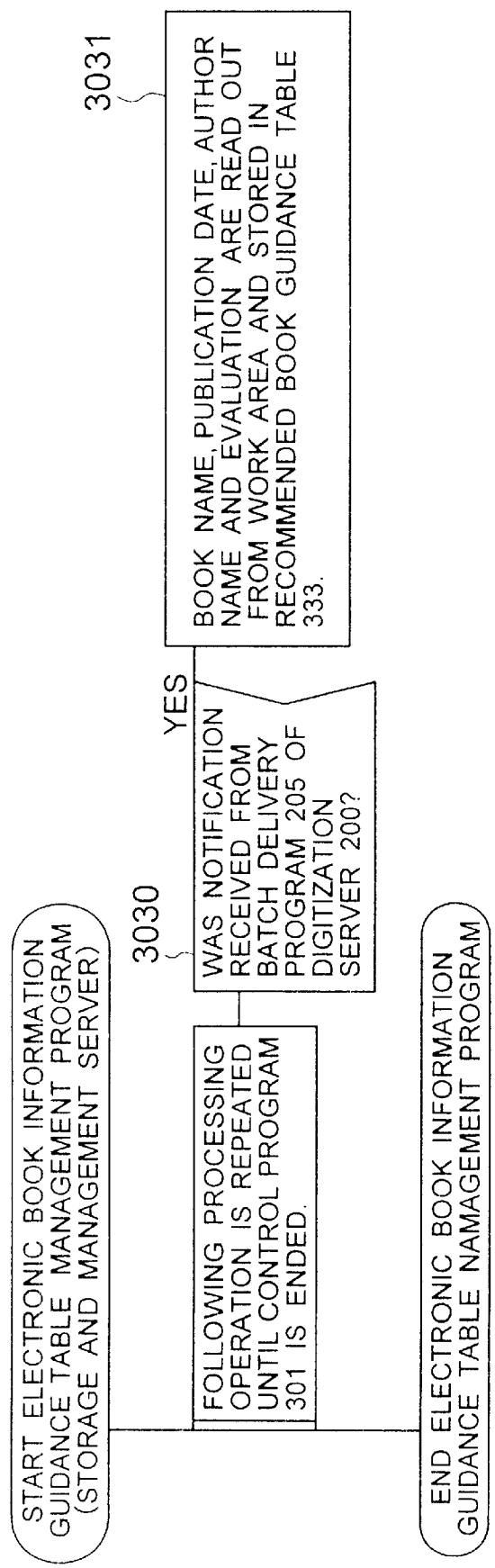
FIG. 30 is a PAD diagram showing a structure and contents of an electronic book information guidance table management program in the storage and management server in the embodiment.

FIG. 30 is a flow chart showing the processing procedure and the contents of the electronic book information guidance table management program 303 of the storage and management server 300 of the embodiment.

The processing of the electronic book information guidance table management program 303 includes the following steps.

The following processing operation is repeated until the control program 301 is ended.

Step 3030: Was the notification received from the batch delivery program 205 of the digitization server 200?

Step 3031: The book name, the publication date, the author name, the publisher name and the evaluation are read out from the work area, and stored in the recommended book guidance table 333. The processing of the electronic book information guidance table management program 303 is ended.

FIG. 31 is a flow chart showing the processing procedure and the contents of the sales information management program 304 of the storage and management server 300 of the embodiment.

The processing of the sales information management program 304 includes the following steps.

The following processing operation is repeated until the control program 301 is ended.

Step 3040: Was the sales information received from the sales information management program 405 of the delivery management server 400?

Step 3041: The ranking information of book name, author name, amount of sales, price, sales number and the like is totaled from the sales information, and stored in the work area.

Step 3042: The book name, the author name, the amount of sales, the price and the sales number are read out from the work area as the totaled result in the above step, and stored in the ranking information management table 331. The processing of the sales information management program 304 is ended.

Figure 32:
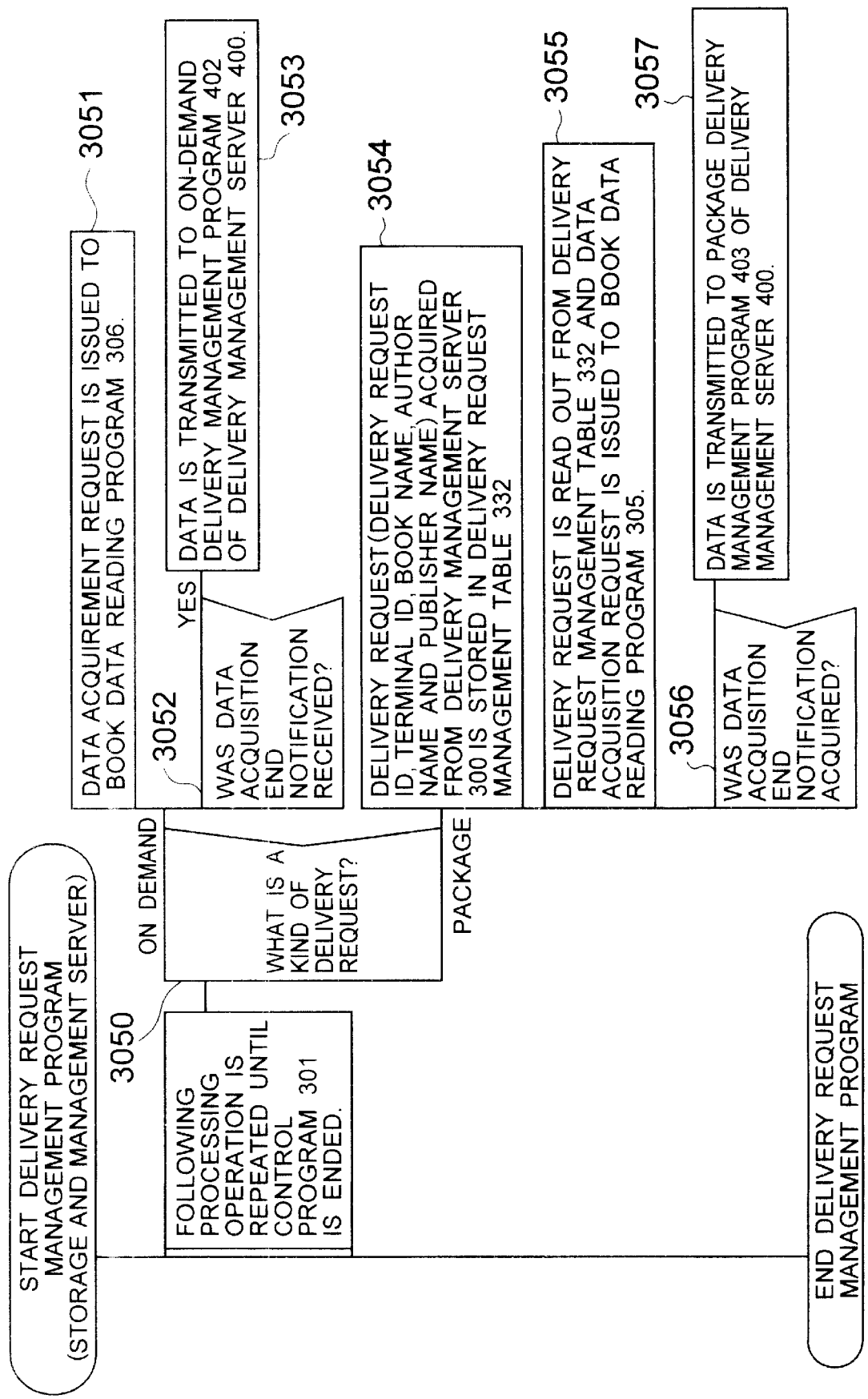
FIG. 32 is a PAD diagram showing a structure and contents of a delivery request management program in the storage and management server in the embodiment.

FIG. 32 is a flow chart showing the processing procedure and contents of the delivery request management program 305 of the storage and management server 300 of the embodiment.

The processing of the delivery request management program 305 includes the following steps.

The following processing operation is repeated until the control program 301 is ended.

Step 3050: What is a kind of the delivery request?

Step 3051: A data acquirement request is issued to the book data reading program 306.

Step 3052: Was the data acquisition end notification received?

Step 3053: Data is transmitted to the on-demand delivery management program 402 of the delivery management server 400.

Step 3054: The delivery request (the delivery request ID, the terminal ID, the book name, the author name and the publisher name) acquired from the delivery management server 300 is stored in the delivery request management table 332.

Step 3055: The delivery request is read out from the delivery request management table 332, and the data acquisition request is issued to the book data reading program 305.

Step 3056: Was the data acquisition end notification acquired?

Step 3057: The data is transmitted to the package delivery management program 403 of the delivery management server 400, and the processing of the delivery request management program 305 is ended.

FIG. 33 is a flow chart showing the processing procedure and the contents of the book data reading program 306 of the storage and management server 300 of the embodiment.

The processing of the book data reading program 306 includes the following steps.

The following processing operation is repeated until the control program 301 is ended.

Step 3060: What kind of delivery request is issued from the delivery request management program 305?

Step 3061: A relevant electronic book is read out from the electronic book information management table 330, and notified to the transmission data combining program 307.

Step 3062: Were the combination end notification and the combination data acquired from the transmission data combining program 307?

Step 3063: The data reading end notification and the data are transmitted to the delivery request management program 305 of the storage and management server 300.

Step 3064: The record (the book name, the publication date, the author name and the evaluation) satisfying the evaluation (3334)≦4 is read out from the recommended book guidance table 333, and stored in the work area.

Step 3065: The record (the book name, the publication date, the amount of sales, the price and the sales number) satisfying the ranking (3311)≦20 is read out from the ranking information management table 331, and stored in the work area.

Step 3066: The electronic book pertinent to the delivery request object from the delivery request management program 305 and the electronic book pertinent to the record stored in the work area in the above step are read out from the electronic book information management table 330, and notified to the transmission data combining program 307.

Step 3067: Was the data combination end notification acquired from the transmission data combining program 307?

Step 3068: The data reading end notification and the data are transmitted to the delivery request management program 305 of the storage and management server 300, and the processing of the book data reading program 306 is ended.

FIG. 34 is a flow chart of the processing procedure and contents of the transmission data combining program 307 of the storage and management server 300 of the embodiment.

The processing of the transmission data combining program 307 includes the following steps.

The following processing operation is repeated until the control program 301 is ended.

Step 3070: Was the combination request received from the book data reading program 306?

Step 3071: The combining processing of the designated electronic book is performed.

Step 3072: The combination end notification and the combined data are transmitted to the book data reading program 306, and the processing of the transmission data combining program 307 is ended.

Figure 35:
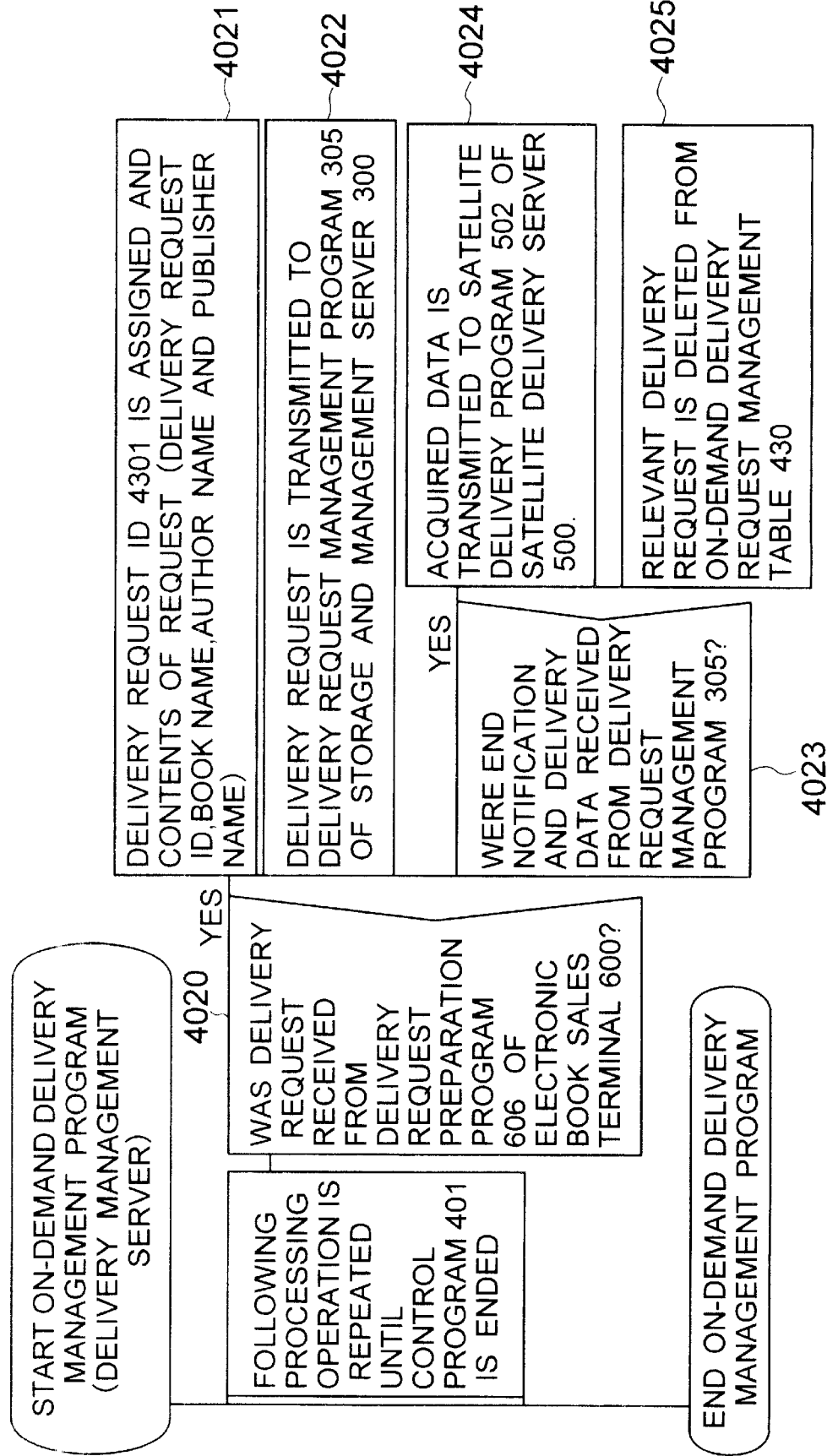
FIG. 35 is a PAD diagram showing a structure and contents of an on-demand delivery management program in the delivery management server in the embodiment.

FIG. 35 is a flow chart showing the processing procedure and contents of the on-demand delivery management program 402 of the delivery management server 400 of the embodiment.

The processing of the on-demand delivery management program 402 includes the following steps.

The following processing operation is repeated until the control program 401 is ended.

Step 4020: Was the delivery request received from the delivery request production program 606 of the electronic book sales terminal 600?

Step 4021: A delivery request ID4301 is assigned, and the contents of the request (delivery request ID, terminal ID, book name, author name and publisher name) are stored in the on-demand delivery request management table 430.

Step 4022: The delivery request is transmitted to the delivery request management program 305 of the storage and management server 300.

Step 4023: Were the end notification and the delivery data received from the delivery request management program 305?

Step 4024: The acquired data is transmitted to the satellite delivery program 502 of the satellite delivery server 500.

Step 4025: The relevant delivery request is deleted from the on-demand delivery request management table 430, and the processing of the on-demand delivery management program is ended.

Figure 36:
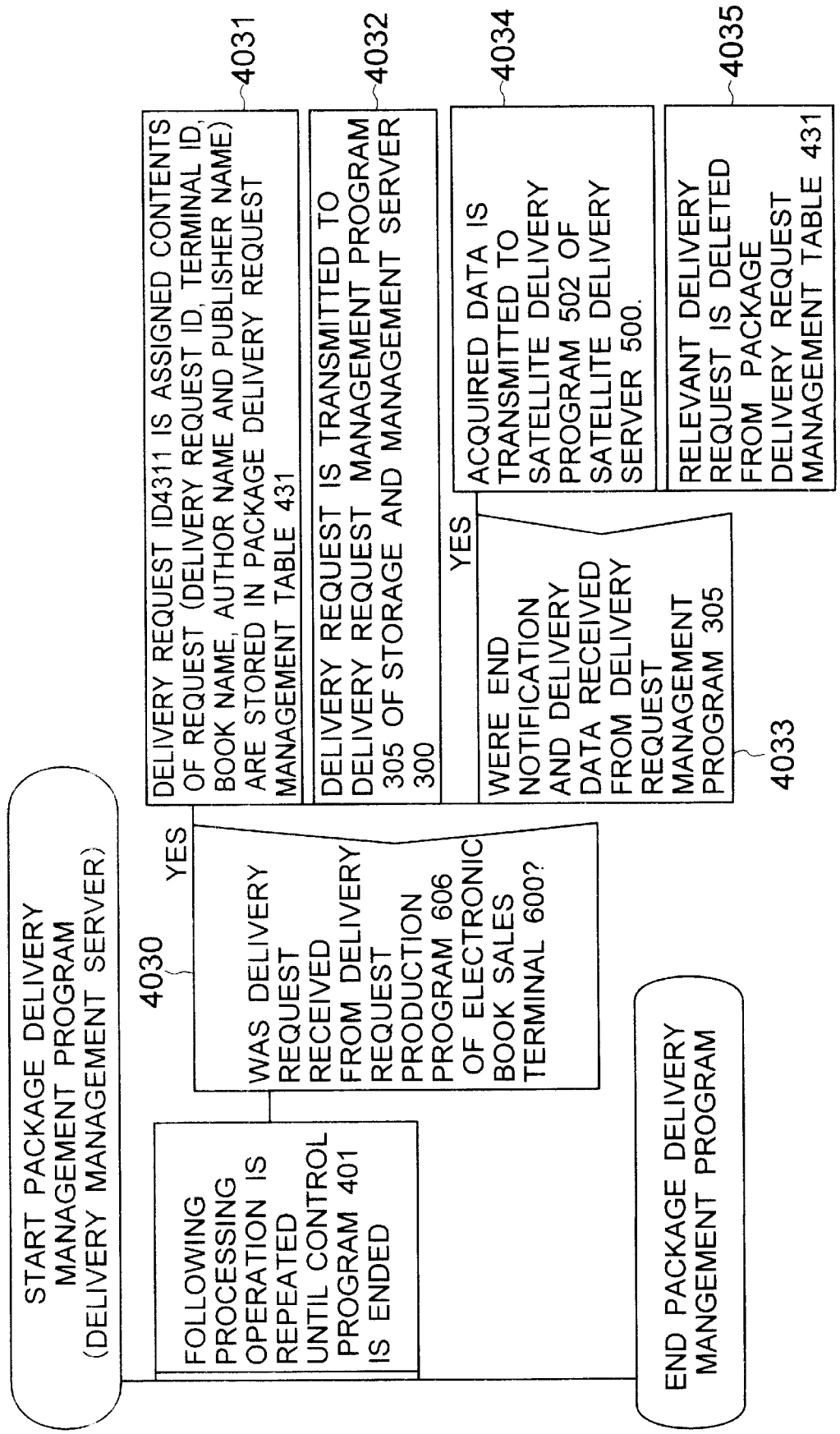
FIG. 36 is a PAD diagram showing a structure and contents of a package delivery management program in the delivery and management server in the embodiment.

FIG. 36 is a flow chart showing the processing procedure and the contents of the package delivery management program 403 of the delivery management server 400 of the embodiment.

The processing of the package delivery management program 403 includes the following steps.

The following processing operation is repeated until the control program 401 is ended.

Step 4030: Was the delivery request received from the delivery request production program 606 of the electronic book sales terminal 600?

Step 4031: A delivery request ID4311 is assigned, and the contents of the request (delivery request ID, terminal ID, book name, author name and publisher name) are stored in the package delivery request management table 431.

Step 4032: The delivery request is transmitted to the delivery request management program 305 of the storage and management server 300.

Step 4033: Were the end notification and the delivery data received from the delivery request management program 305?

Step 4034: The acquired data is transmitted to the satellite delivery program 502 of the satellite delivery server 500.

Step 4035: The relevant delivery request is deleted from the package delivery request management table 431, and the processing of the package delivery management program 403 is ended.

FIG. 37 is a flow chart showing the processing procedure and the contents of the goods purchase management program 404 of the delivery management server 400 of the embodiment.

The processing of the goods purchase management program 404 includes the following steps.

The following processing operation is repeated until the control program 401 is ended.

Step 4040: Was a purchase request received from the book sales processing 604?

Step 4041: The purchase processing is performed.

Step 4042: Was the purchase processing ended?

Step 4043: Contents of the purchase (terminal ID, user ID, book name, author name, goods ID and the like) are notified to the sales information management program 405.

Step 4044: The purchase processing end notification is transmitted to the book sales processing program 605 of the electronic book sales terminal 600, and the processing of the goods purchase management program 404 is ended.

Figure 38:
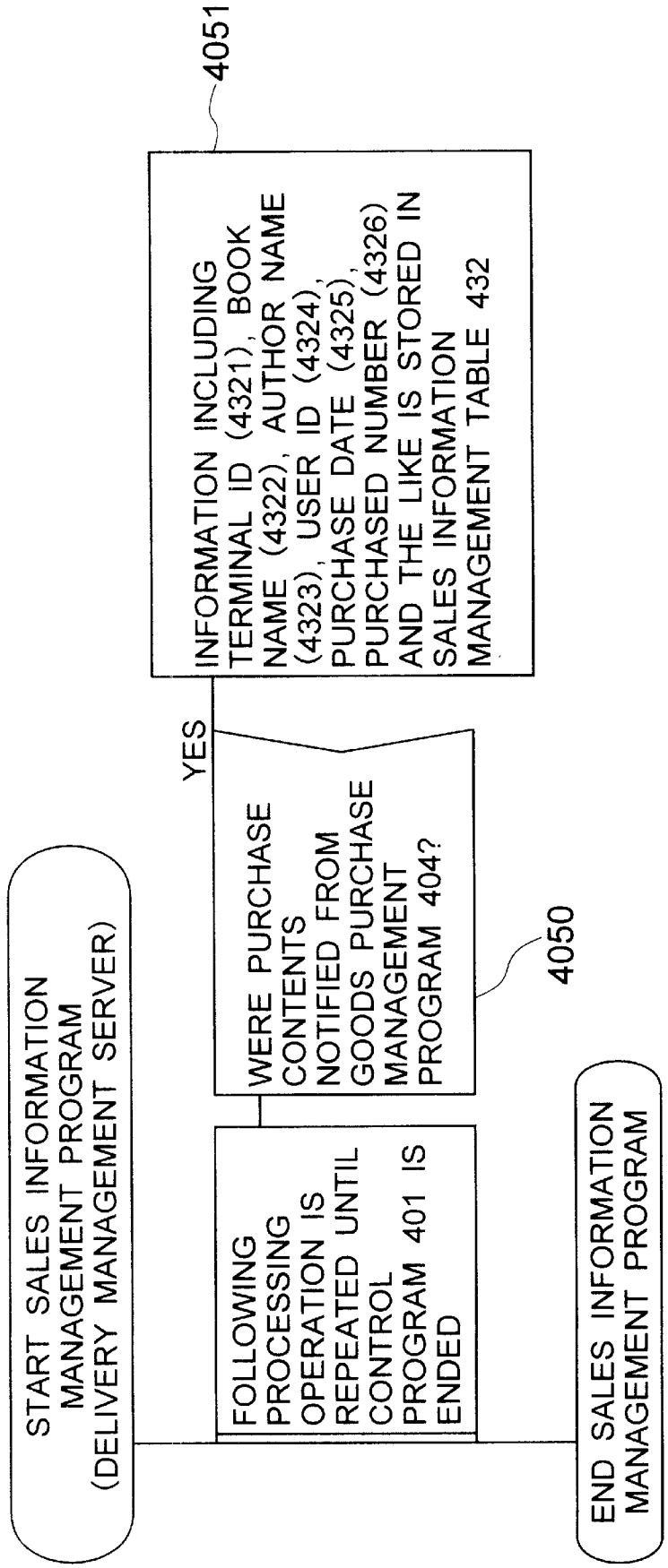
FIG. 38 is a PAD diagram showing a structure and contents of a sales information management program in the delivery management server in the embodiment.

FIG. 38 is a flow chart showing the processing procedure and the contents of the sales information management program 405 of the delivery management server 400 of the embodiment.

The processing of the sales information management program 405 includes the following steps.

The following processing operation is repeated until the control program 401 is ended.

Step 4050: Were the purchase contents notified from the goods purchase management program 404?

Step 4051: Information including the terminal ID (4321), the book name (4322), the author name (4323), the user ID (4324), the purchase date (4325), the purchased number (4326) and the like is stored in the sales information management table 432, and the processing of the sales information management program 405 is ended.

Figure 39:
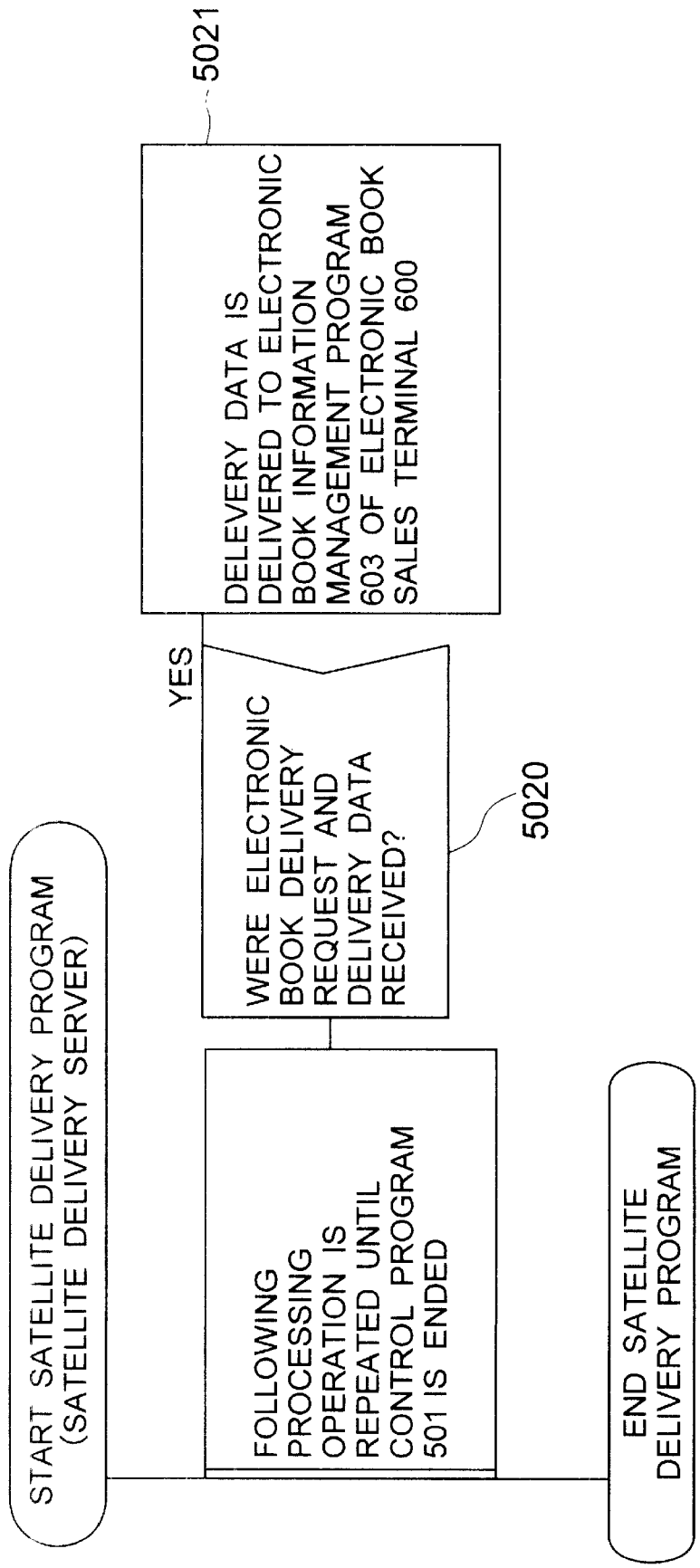
FIG. 39 is a PAD diagram showing a structure and contents of a satellite delivery management program in the satellite delivery server in the embodiment.

FIG. 39 is a flow chart showing the processing procedure and the contents of the satellite delivery program 502 of the satellite delivery server 500 of the embodiment.

The processing of the satellite delivery program 502 includes the following steps.

The following processing operation is repeated until the control program 501 is ended.

Step 5020: Were the electronic book delivery request and the delivery data received?

Step 5021: The delivery data is delivered to the electronic book information management program 603 of the electronic book sales terminal 600, and the processing of the satellite delivery program 502 is ended.

FIG. 40 is a flow chart showing the processing procedure and the contents of the electronic book information management program 603 of the electronic book sales terminal 600 of the embodiment.

The processing of the electronic book information management program 603 includes the following steps.

The following processing operation is repeated until the control program 601 is ended.

Step 6030: Was the delivery data acquired from the satellite delivery program 502 of the satellite delivery server 500?

Step 6031: The book name (6301), the publication date (6302), the author name (6303), the publisher name (6304), the price (6305), the keyword (6306) and the file itself (6307) are stored in the electronic book information management table 630.

Step 6032: The acquired electronic book information (the book ID, the book name, information indicating whether the data has been acquired in response to the on-demand delivery request or the package delivery and the like) is notified to the custody book management server 605, and the processing of the electronic book information processing program 603 is ended.

FIG. 41 is a flow chart showing the processing procedure and the contents of the custody book management program 605 of the electronic book sales terminal 600 of the embodiment.

The processing of the custody book management program 605 includes the following steps.

The following processing operation is repeated until the control program 601 is ended.

Step 6050: From which program was the notification received?

Step 6051: "1" a is added to the sales number (6312) at a relevant week and the total sales number (6313) for a relevant electronic book ID (6311) in the custody book management table 631.

Step 6052: Did the notified data correspond to the data acquired in response to the on-demand delivery request?

Step 6053: "1" is added to the sales number (6312) at a relevant week and the total sales number (6313) for a relevant electronic book ID (6311) in the custody book management table 631, and the processing of the custody book management program 605 is ended.

Figure 42:
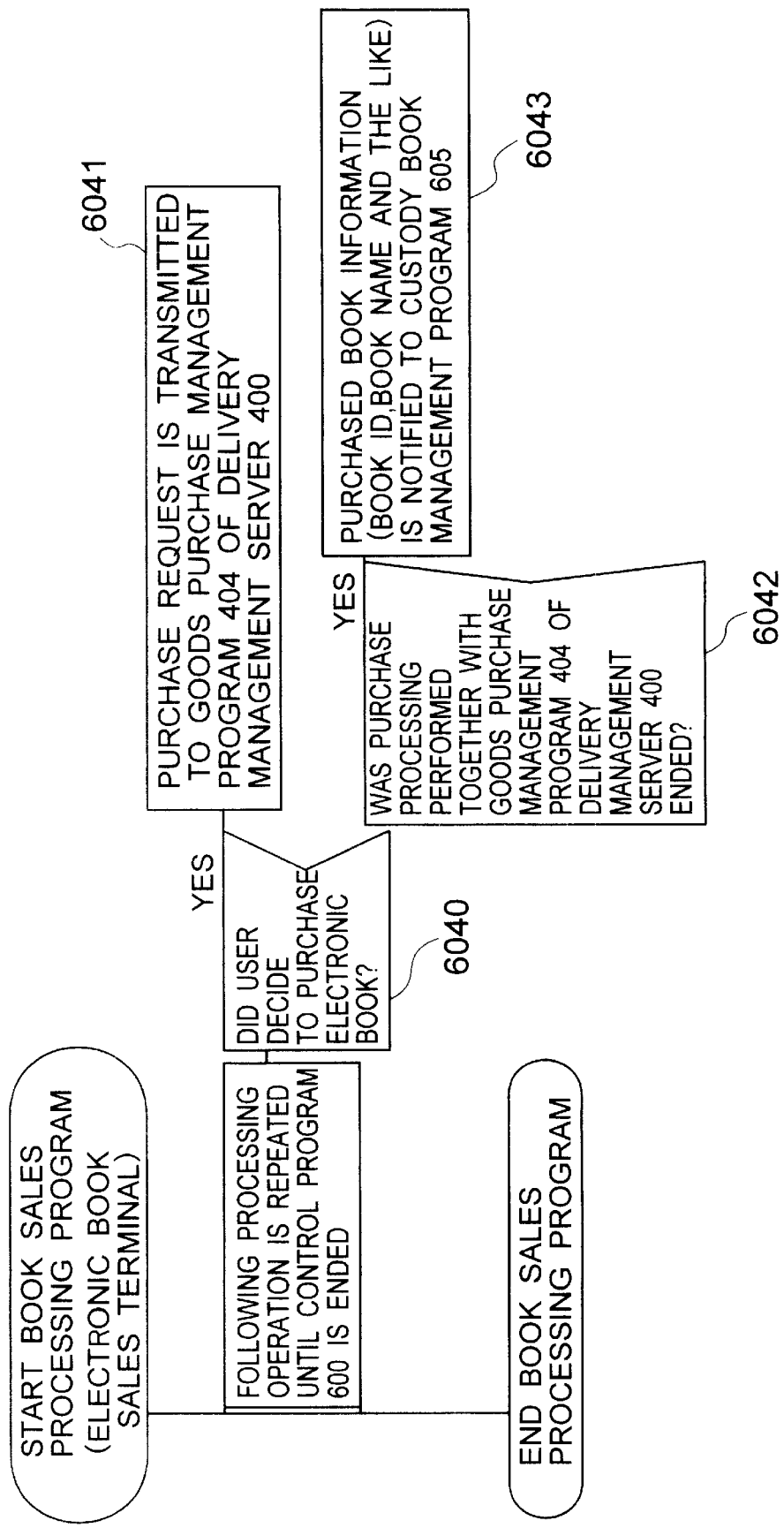
FIG. 42 is a PAD diagram showing a structure and contents of a book sales processing program in the electronic book sales terminal in the embodiment.

FIG. 42 is a flow chart showing the processing procedure and the contents of the book sales processing program 604 of the electronic book sales terminal 600 of the embodiment.

The processing of the book sales processing program 604 includes the following steps.

The following processing operation is repeated until the control program 601 is ended.

Step 6040: Did the user decide to purchase the electronic book?

Step 6041: The purchase request is transmitted to the goods purchase management program 404 of the delivery management server 400.

Step 6042: Was the purchase processing performed together with the goods purchase management program 404 of the delivery management server 400 ended?

Step 6043: The purchased book information (the book ID, the book name and the like) is notified to the custody book management program 605, and the processing of the book sales processing program 604 is ended.

FIG. 43 is a flow chart showing the processing procedure and the contents of the delivery request production program 606 of the electronic book sales terminal 600 of the embodiment.

The processing of the delivery request production program 606 includes the following steps.

The following processing operation is repeated until the control program 601 is ended.

Step 6060: Was the production time of the package delivery request reached?

Step 6061: Information 6315 relative to the week of the month at the present time is read out from the custody book management table 631, and stored in the work area.

Step 6062: Information relative to the week of the month at the present time is read out from the work area and electronic book having the total sales number which is in a higher rank and electronic book having sales number which is not in a higher rank but increasing at a week near the week are selected from the custody book management table 631. Records (the book ID, the sales number at each week, the total sales number and the like) of electronic book other than the selected electronic book are deleted.

Step 6063: Records for the delivery request (the book ID, the book name, the author name, the publisher name and the like) are read out from the package delivery request management table 632, and stored in the work area.

Step 6064: The records for the delivery request (the book ID, the book name, the author name and the publisher name)

are acquired from the work area, and notified to the package delivery management program 403 of the delivery management server 400.

Step 6065: Was the on-demand delivery request received from the user?

Step 6066: The on-demand delivery request from the user is stored in the work area.

Step 6067: The on-demand delivery request is read out from the work area, and notified to the on-demand delivery management program 402. The processing of the delivery request production program 606 is ended.

FIG. 44 is a flow chart showing the processing procedure and the contents of the user's input receiving program 602 of the electronic book sales terminal 600 of the embodiment.

The processing of the user's input receiving program 602 includes the following steps.

Step 6020: The book name (6331), the book ID (6332), the publisher name (6333) and the author name (6334) inputted by the user by means of the inputting and setting picture 633 of the package delivery request are received, and stored in the work area.

Step 6021: Was the setting button pushed?

Step 6020: The book name (6331), the book ID (6332), the publisher name (6333) and the author name (6334) are read out from the work area, and stored in the package delivery request management table 632. The processing of the user's input receiving program 602 is ended.

The electronic book delivery schedule management method and apparatus in which the present invention is applied to the electronic book sales system has been described as above, while it will be able to be easily conjectured that the present invention can be applied to the delivery schedule management method and apparatus for electronic data such as an electronic voice and an electronic image.

The present invention has been described with reference to the embodiment concretely, while the invention is not limited to the above embodiment and it is needless to say that various changes and modifications may be made in the invention without departing from the sprit and the scope of the invention.

As described above, the user's terminal for electronic data such as an electronic voice and an electronic image can acquire electronic data satisfying the user's request promptly.

Further, there can be provided the delivery schedule management method and apparatus which manages the delivery schedule of the electronic data (digital contents) for the electronic book, the electronic voice and the electronic image.

Furthermore, the delivery efficiency and the utilization efficiency of the electronic data (digital contents) for the electronic book, the electronic voice and the electronic image can be improved.

In addition, there can be provided the delivery schedule method and apparatus which manage the delivery schedule for delivering the electronic book which is previously stored in the electronic book sales terminal connected through the network.

Moreover, the electronic book sales terminal can provide the electronic book satisfying user's taste (request) promptly.

What is claimed is:

1. A delivery schedule management method of managing delivery schedule of delivery data in an electronic data distribution system which connects a delivery data server for inputting the delivery data, a digitization server for digitizing the delivery data, a storage and management server for storing and managing electronic delivery data, a delivery management server for managing delivery of the electronic delivery data, and an electronic user terminal for receiving delivered electronic data and treating received electronic data to one another through a network, comprising the steps of:

setting an evaluation value of the delivery data to be digitized, in the delivery data server;

digitizing the delivery data and the evaluation value, and registering the digitized delivery data and the digitized evaluation value in the storage and management server, in the digitization server;

performing a processing of electronic utilization data selected by a user between the delivery management server and the electronic user terminal;

managing information of the processed electronic utilization data in the delivery management server;

producing an on-demand delivery request at a stage that the electronic user terminal acquires actual electronic data after processing the electronic utilization data, and transmitting the on-demand delivery request to the delivery management server, in the electronic user terminal;

performing management (scheduling) of the on-demand delivery request, transmitting the management (scheduling) of the on-demand delivery request to the storage and management server, acquiring relevant electronic data based on the management (scheduling) of the delivery request, and transmitting the relevant electronic data to the delivery management server, in the delivery management server which acquires the on-demand delivery request; and delivering the relevant electronic data to the electronic user terminal from the delivery management server.

2. A delivery schedule management method of managing delivery schedule of delivery data in an electronic data distribution system which connects a delivery data server for inputting the delivery data, a digitization server for digitizing the delivery data, a storage and management server for storing and managing electronic delivery data, a delivery management server for managing delivery of the electronic delivery data, and an electronic user terminal for receiving delivered electronic data and treating received electronic data to one another through a network, comprising the steps of:

performing disk management and a delivery request (production of a delivery request according to utilization tendency of delivery data) peculiar to the electronic user terminal, and transmitting information thereof to the delivery management server, in the electronic user terminal;

performing management (scheduling) of the delivery request, transmitting the management (scheduling) of the delivery request to the storage and management server, acquiring relevant electronic data based on the management (scheduling) of the delivery request from the storage and management server, and transmitting the relevant electronic data to the delivery management server, in the delivery management server which acquires the delivery request; and delivering the relevant electronic data to the electronic user terminal from the delivery management server.

3. A delivery schedule management method of managing delivery schedule of delivery data in an electronic data distribution system which connects a delivery data server for inputting the delivery data, a digitization server for digitizing the delivery data, a storage and management server for storing and managing electronic delivery data, a delivery management server for managing delivery of the electronic delivery data, and an electronic user terminal for receiving delivered electronic data and treating received electronic data to one another through a network, comprising the steps of:

setting an evaluation value of the delivery data to be digitized, in the delivery data server;

digitizing the delivery data and the evaluation value, and register the digitized delivery data and the digitized evaluation value in the storage and management server, determining and reading data to be previously delivered to the electronic user terminal, based on a delivery request of the electronic user terminal acquired through the delivery management server, delivery data treating information and the evaluation value of the delivery data from the digitization server, and transmitting the data to the delivery management server, in the digitization server; and delivering the data to the electronic user terminal from the delivery management server.

4. A delivery schedule management method of managing delivery schedule of delivery data in an electronic data distribution system which connects a delivery data server for inputting the delivery data, a digitization server for digitizing the delivery data, a storage and management server for storing and managing electronic delivery data, a delivery management server for managing delivery of the electronic delivery data, and an electronic user terminal for receiving delivered electronic data and treating received electronic data to one another through a network, comprising the steps of:

setting an evaluation value of the delivery data to be digitized, in the delivery data server;

determining and reading data to be previously delivered to the electronic user terminal, based on a delivery request of the electronic user terminal acquired through the delivery management server, delivery data treating information and the evaluation value of the delivery data from the digitization server, in the storage and management server; and performing disk management and production of a delivery request according to utilization tendency of the delivery data of the electronic user terminal, in the electronic user terminal.

5. A delivery schedule management apparatus for managing delivery schedule of delivery data in an electronic data distribution system which connects a delivery data server for inputting the delivery data, a digitization server for digitizing the delivery data, a storage and management server for storing and managing electronic delivery data, a delivery management server for managing delivery of the electronic delivery data, and an electronic user terminal for receiving delivered electronic data and treating received electronic data to one another through a network, wherein the delivery data server comprises means for evaluating the delivery data;

the storage and management server comprises means for determining and reading information of electronic data to be delivered, based on the evaluation of the delivery data, object treating information and a delivery request, the object treating information and the delivery request being acquired through the delivery management server; and the electronic user terminal comprises means for managing a disk peculiar to the electronic user terminal, and means for producing the delivery request in accordance with an electronic data treating tendency in the electronic user terminal.

* * * * *